(12) United States Patent
Tong et al.

(10) Patent No.: US 12,673,528 B2
(45) Date of Patent: Jul. 7, 2026

(54) HYDRAULIC CROSS-LINKED SUSPENSION

(71) Applicant: Fox Factory, Inc., Duluth, GA (US)

(72) Inventors: Ivan Tong, San Diego, CA (US);
Connor Randall, Salida, CO (US);
Rick Strickland, Watsonville, CA (US)

(73) Assignee: Fox Factory, Inc., Duluth, GA (US)

( * ) Notice: Subject to any disclaimer, the term of this
patent is extended or adjusted under 35
U.S.C. 154(b) by 345 days.

(21) Appl. No.: 18/113,021

(22) Filed: Feb. 22, 2023

(65) Prior Publication Data

US 2023/0302867 A1    Sep. 28, 2023

Related U.S. Application Data

(60) Provisional application No. 63/313,023, filed on Feb.
23, 2022.

(51) Int. Cl.
B60G 17/08        (2006.01)
B60G 17/02        (2006.01)

(52) U.S. Cl.
CPC ........... B60G 17/08 (2013.01); B60G 17/021
(2013.01); *B60G 2202/13* (2013.01); *B60G*
*2202/24* (2013.01)

(58) Field of Classification Search
CPC ................. B60G 17/08; B60G 17/021; B60G
2202/152; B60G 2202/154; B60G
2202/24; B60G 11/27; B60G 2206/41
See application file for complete search history.

(56) References Cited

U.S. PATENT DOCUMENTS

| | | | |
|---|---|---|---|
| 2,836,431 | A | 5/1958 | Antoine |
| 2,941,815 | A | 6/1960 | Josef |
| 3,357,512 | A | 12/1967 | Wilson |
| 3,602,470 | A | 8/1971 | Reynolds |
| 3,871,635 | A | 3/1975 | Unruh et al. |
| 3,986,118 | A | 10/1976 | Madigan |
| 4,159,756 | A | 7/1979 | Murakami et al. |
| 4,183,509 | A | 1/1980 | Nishikawa et al. |
| 4,589,528 | A | 5/1986 | Axthammer et al. |
| 4,773,671 | A | 9/1988 | Inagaki |
| 4,921,080 | A | 5/1990 | Lin |
| 4,958,704 | A | 9/1990 | Leiber et al. |
| 4,984,819 | A | 1/1991 | Kakizaki et al. |
| 5,027,303 | A | 6/1991 | Witte |
| 5,035,306 | A | 7/1991 | Ashiba |

(Continued)

FOREIGN PATENT DOCUMENTS

| | | |
|---|---|---|
| CN | 116568533 A | 8/2023 |
| DE | 2849015 A1 | 5/1980 |

(Continued)

OTHER PUBLICATIONS

European Examination Report for EP Application No. 21215569.1,
5 pages, Mailed Jan. 8, 2025.

(Continued)

*Primary Examiner* — James A English

(57)        ABSTRACT

Disclosed herein is an accumulator comprising a cylinder,
and an internal floating piston. The internal floating piston
divides the cylinder into a spring chamber and a gas cham-
ber, and the spring chamber allows fluid to flow. The
accumulator further comprises a negative spring disposed in
the spring chamber.

17 Claims, 20 Drawing Sheets

(56) References Cited

U.S. PATENT DOCUMENTS

| | | | |
|---|---|---|---|
| 5,105,918 A | 4/1992 | Hagiwara et al. | |
| 5,149,131 A | 9/1992 | Sugasawa et al. | |
| 5,171,036 A | 12/1992 | Ross | |
| 5,172,794 A | 12/1992 | Ward | |
| 5,186,486 A | 2/1993 | Hynds et al. | |
| 5,236,520 A | 8/1993 | Gallagher | |
| 5,265,703 A | 11/1993 | Ackermann | |
| 5,295,705 A | 3/1994 | Butsuen et al. | |
| 5,362,094 A | 11/1994 | Jensen | |
| 5,390,949 A | 2/1995 | Naganathan et al. | |
| 5,522,280 A | 6/1996 | Bexten | |
| 5,597,180 A | 1/1997 | Ganzel et al. | |
| 5,624,105 A * | 4/1997 | Runkel | F15B 1/24 |
| | | | 267/64.15 |
| 5,630,623 A | 5/1997 | Ganzel | |
| 5,899,472 A * | 5/1999 | Burke | B60G 21/073 |
| | | | 280/5.506 |
| 5,921,360 A | 7/1999 | Moradmand | |
| 5,952,823 A | 9/1999 | Sprecher et al. | |
| 5,987,366 A | 11/1999 | Jun | |
| 6,073,536 A | 6/2000 | Campbell | |
| 6,135,434 A * | 10/2000 | Marking | F16F 9/062 |
| | | | 188/315 |
| 6,244,398 B1 | 6/2001 | Girvin et al. | |
| 6,250,658 B1 * | 6/2001 | Sakai | B60G 21/073 |
| | | | 280/124.16 |
| 6,276,693 B1 | 8/2001 | Oakley et al. | |
| 6,427,812 B2 | 8/2002 | Crawley et al. | |
| 6,457,730 B1 | 10/2002 | Urbach | |
| 6,520,510 B1 | 2/2003 | Germain et al. | |
| 6,669,208 B1 * | 12/2003 | Monk | B60G 21/067 |
| | | | 280/5.506 |
| 6,863,291 B2 | 3/2005 | Miyoshi | |
| 6,935,157 B2 | 8/2005 | Miller | |
| 7,234,714 B2 | 6/2007 | Germain et al. | |
| 7,374,028 B2 | 5/2008 | Fox | |
| 7,384,053 B1 | 6/2008 | Boecker et al. | |
| 7,472,914 B2 | 1/2009 | Anderson et al. | |
| 7,484,603 B2 | 2/2009 | Fox | |
| 7,997,588 B2 | 8/2011 | Ohnuma et al. | |
| 8,220,807 B2 | 7/2012 | Lorenzon et al. | |
| 8,534,687 B2 * | 9/2013 | Coombs | F16F 9/46 |
| | | | 188/266.2 |
| 8,550,223 B2 | 10/2013 | Cox et al. | |
| 8,627,932 B2 | 1/2014 | Marking | |
| 8,807,542 B2 | 8/2014 | Wootten et al. | |
| 8,838,335 B2 | 9/2014 | Bass et al. | |
| 8,857,580 B2 | 10/2014 | Marking | |
| 8,899,560 B2 | 12/2014 | Allen et al. | |
| 8,955,653 B2 | 2/2015 | Marking | |
| 9,033,122 B2 | 5/2015 | Ericksen et al. | |
| 9,058,038 B2 | 6/2015 | Zhang et al. | |
| 9,120,362 B2 | 9/2015 | Marking | |
| 9,239,090 B2 | 1/2016 | Marking | |
| 9,303,712 B2 | 4/2016 | Cox | |
| 9,340,088 B2 | 5/2016 | Otake et al. | |
| 9,353,818 B2 | 5/2016 | Marking | |
| 9,452,654 B2 | 9/2016 | Ericksen et al. | |
| 9,471,697 B2 | 10/2016 | Lortz et al. | |
| 9,491,788 B1 | 11/2016 | Kasai et al. | |
| 9,623,716 B2 | 4/2017 | Cox | |
| 9,682,604 B2 | 6/2017 | Cox et al. | |
| 9,797,467 B2 | 10/2017 | Wootten et al. | |
| 10,036,443 B2 | 7/2018 | Galasso et al. | |
| 10,040,329 B2 | 8/2018 | Ericksen et al. | |
| 10,047,817 B2 | 8/2018 | Ericksen et al. | |
| 10,060,499 B2 | 8/2018 | Ericksen et al. | |
| 10,086,673 B2 | 10/2018 | Baales et al. | |
| 10,415,662 B2 | 9/2019 | Marking | |
| 10,443,671 B2 | 10/2019 | Marking | |
| 10,737,546 B2 | 8/2020 | Tong | |
| 10,825,266 B2 | 11/2020 | Srinivasan et al. | |
| 10,933,710 B2 | 3/2021 | Tong | |
| 10,981,429 B2 | 4/2021 | Tsiaras et al. | |

| | | | |
|---|---|---|---|
| 11,097,590 B2 | 8/2021 | Simula et al. | |
| 11,173,767 B2 | 11/2021 | Cox | |
| 11,192,424 B2 | 12/2021 | Tabata et al. | |
| 11,584,182 B1 | 2/2023 | Smith | |
| 11,634,003 B2 | 4/2023 | Negishi et al. | |
| 11,878,678 B2 | 1/2024 | Krosschell et al. | |
| 11,904,648 B2 | 2/2024 | Graus et al. | |
| 11,926,189 B2 | 3/2024 | Tsiaras et al. | |
| 11,993,121 B1 | 5/2024 | Schubart et al. | |
| 12,083,850 B2 | 9/2024 | Strickland et al. | |
| 12,404,847 B2 | 9/2025 | Schubart et al. | |
| 12,545,072 B2 | 2/2026 | Cox | |
| 2002/0125675 A1 | 9/2002 | Clements et al. | |
| 2004/0113377 A1 | 6/2004 | Klees | |
| 2004/0173985 A1 | 9/2004 | Bruhl et al. | |
| 2004/0231904 A1 | 11/2004 | Beck et al. | |
| 2005/0077696 A1 | 4/2005 | Ogawa | |
| 2005/0082127 A1 | 4/2005 | Barber et al. | |
| 2006/0287791 A1 | 12/2006 | Boon et al. | |
| 2007/0235955 A1 | 10/2007 | Mizukoshi et al. | |
| 2008/0129000 A1 | 6/2008 | Munday et al. | |
| 2008/0203694 A1 | 8/2008 | Gartner et al. | |
| 2009/0140501 A1 | 6/2009 | Taylor et al. | |
| 2009/0267311 A1 | 10/2009 | Ohnuma et al. | |
| 2010/0225084 A1 | 9/2010 | Chapman et al. | |
| 2012/0018263 A1 | 1/2012 | Marking | |
| 2012/0205843 A1 * | 8/2012 | Allen | B60G 15/12 |
| | | | 267/64.25 |
| 2013/0197755 A1 | 8/2013 | Otake et al. | |
| 2013/0228404 A1 | 9/2013 | Marking | |
| 2013/0292218 A1 * | 11/2013 | Ericksen | B62K 25/08 |
| | | | 188/266.2 |
| 2014/0008160 A1 | 1/2014 | Marking et al. | |
| 2014/0224606 A1 | 8/2014 | Baales et al. | |
| 2014/0239602 A1 | 8/2014 | Blankenship et al. | |
| 2015/0083535 A1 | 3/2015 | Ericksen et al. | |
| 2015/0224845 A1 | 8/2015 | Avadhany et al. | |
| 2015/0290991 A1 | 10/2015 | Cox | |
| 2016/0265615 A1 | 9/2016 | Marking | |
| 2017/0120713 A1 | 5/2017 | Drozdowski et al. | |
| 2017/0129302 A1 | 5/2017 | Jackson | |
| 2017/0136842 A1 | 5/2017 | Anderson et al. | |
| 2017/0282669 A1 | 10/2017 | Cox et al. | |
| 2018/0345747 A1 | 12/2018 | Boon et al. | |
| 2019/0001775 A1 | 1/2019 | Anderson et al. | |
| 2019/0100071 A1 | 4/2019 | Tsiaras et al. | |
| 2019/0241039 A1 * | 8/2019 | Simula | B60G 21/0551 |
| 2019/0360505 A1 | 11/2019 | Belter et al. | |
| 2020/0180385 A1 | 6/2020 | Marking | |
| 2021/0061052 A1 | 3/2021 | Kim | |
| 2021/0086581 A1 | 3/2021 | Smith | |
| 2021/0114431 A1 | 4/2021 | Cox | |
| 2021/0197640 A1 | 7/2021 | Yamashita | |
| 2021/0229519 A1 | 7/2021 | Tsiaras et al. | |
| 2021/0309063 A1 | 10/2021 | Negishi et al. | |
| 2021/0309064 A1 | 10/2021 | Negishi et al. | |
| 2021/0316716 A1 | 10/2021 | Krosschell et al. | |
| 2022/0016949 A1 | 1/2022 | Graus et al. | |
| 2022/0105777 A1 | 4/2022 | Cox | |
| 2022/0134835 A1 | 5/2022 | Izak et al. | |
| 2022/0144035 A1 * | 5/2022 | Al Sakka | B60G 21/10 |
| 2022/0176769 A1 | 6/2022 | Tong | |
| 2022/0194161 A1 | 6/2022 | Negishi et al. | |
| 2022/0242186 A1 | 8/2022 | Tong | |
| 2022/0242190 A1 | 8/2022 | Stanford et al. | |
| 2022/0355638 A1 | 11/2022 | Worley | |
| 2022/0388362 A1 | 12/2022 | Graus et al. | |
| 2023/0111759 A1 | 4/2023 | Vandersmissen et al. | |
| 2023/0113777 A1 | 4/2023 | Vandersmissen et al. | |
| 2023/0113819 A1 | 4/2023 | Vandersmissen et al. | |
| 2023/0114717 A1 | 4/2023 | Boon et al. | |
| 2023/0115594 A1 | 4/2023 | Calchand et al. | |
| 2023/0202252 A1 | 6/2023 | Smith | |
| 2023/0249702 A1 | 8/2023 | Peterson et al. | |
| 2023/0256785 A1 | 8/2023 | Worley | |
| 2023/0271473 A1 | 8/2023 | Strickland et al. | |
| 2023/0294603 A1 | 9/2023 | Dwyer et al. | |
| 2023/0302865 A1 | 9/2023 | Tong et al. | |
| 2023/0302866 A1 | 9/2023 | Tong et al. | |

(56)  References Cited

U.S. PATENT DOCUMENTS

| | | |
|---|---|---|
| 2023/0302867 A1 | 9/2023 | Tong et al. |
| 2024/0100904 A1 | 3/2024 | Negishi et al. |
| 2024/0131892 A1 | 4/2024 | Graus et al. |
| 2024/0198753 A1 | 6/2024 | Peterson et al. |
| 2024/0286452 A1 | 8/2024 | Jensen et al. |
| 2024/0375474 A1 | 11/2024 | Tsiaras et al. |
| 2025/0083489 A1 | 3/2025 | Strickland et al. |

FOREIGN PATENT DOCUMENTS

| | | | |
|---|---|---|---|
| DE | 102005045177 A1 | 3/2007 | |
| DE | 112005003567 T5 | 3/2008 | |
| DE | 102012006928 A1 | 11/2012 | |
| DE | 202013100681 U1 | 4/2013 | |
| DE | 202013007733 U1 | 10/2013 | |
| DE | 102021104176 A1 | 8/2021 | |
| EP | 0648625 A1 | 4/1995 | |
| EP | 0829383 A2 | 3/1998 | |
| EP | 1000782 A2 | 5/2000 | |
| EP | 1022169 A2 | 7/2000 | |
| EP | 1238833 A1 | 9/2002 | |
| EP | 2123933 A2 | 11/2009 | |
| EP | 1961649 B1 | 12/2010 | |
| EP | 3461663 A1 | 4/2019 | |
| EP | 4112339 A1 | 1/2023 | |
| EP | 4197830 A1 | 6/2023 | |
| EP | 4253106 A1 | 10/2023 | |
| EP | 4269137 A1 | 11/2023 | |
| EP | 4269137 B1 | 10/2025 | |
| EP | 4197830 B1 | 11/2025 | |
| FR | 2927020 A1 | 8/2009 | |
| FR | 3040331 A1 | 3/2017 | |
| FR | 3101809 A1 | 4/2021 | |
| GB | 2006131 A | 5/1979 | |
| GB | 2343663 A | 5/2000 | |
| GB | 2351951 A | 1/2001 | |
| GB | 2377415 A | 1/2003 | |
| GB | 2377415 B | 9/2003 | |
| JP | S61146612 A | 7/1986 | |
| JP | H0419210 A | 1/1992 | |
| JP | H04191115 A | 7/1992 | |
| JP | H11165521 A | 6/1999 | |
| JP | 2001105827 A | 4/2001 | |
| JP | 2002264625 A | 9/2002 | |
| JP | 2016211676 A | 12/2016 | |
| WO | 0166969 A1 | 9/2001 | |
| WO | 03008215 A1 | 1/2003 | |
| WO | 2016060066 A1 | 4/2016 | |
| WO | 2018215176 A1 | 11/2018 | |
| WO | WO-2020214666 A1 * | 10/2020 | ............ B60G 17/08 |
| WO | 2022016155 A1 | 1/2022 | |

OTHER PUBLICATIONS

European Examination Report for EP Application No. 21215569.1, 9 pages, Mailed May 16, 2024.

European Extended Search Report for European Application No. 20879677.1 8 Pages, Mailed Oct. 23, 2023.

European Search Report for EP Application No. 21215569.1, 9 pages, Mailed May 10, 2022.

European Search Report for European Application No. 22215230.8, 9 Pages, Apr. 4, 2023.

European Search Report for European Application No. 23170219.2, 9 Pages, Aug. 22, 2023.

Extended European Search Report for EP Application 22177563.8, dated Nov. 11, 2022, 14 pages.

PCT International Search Report for PCT/US2020/056869, 11 Pages, Mailed Jan. 12, 2021.

"Extended European Search Report for EP Application 18197941.0 dated Feb. 27, 2019, 11 pages".

Shiozaki, et al., "SP-861-Vehicle Dynamics and Electronic Controlled Suspensions SAE Technical Paper Series No. 910661", International Congress and Exposition, Detroit, Mich., Feb. 25-Mar. 1, 1991.

European Search Report for European Application No. 23158363.4, 8 pages, Sep. 6, 2023.

* cited by examiner

HYDRAULIC CROSS-LINKED SUSPENSION

CROSS-REFERENCE TO RELATED APPLICATIONS (PROVISIONAL)

This application claims priority to and benefit of U.S. Provisional Patent Application No. 63/313,023, filed on Feb. 23, 2022, entitled "HYDRAULIC CROSS-LINKED SUSPENSION" by Ivan Tong, and assigned to the assignee of the present application, the disclosure of which is hereby incorporated by reference in its entirety.

FIELD OF THE INVENTION

Embodiments of the invention generally relate to suspension assemblies.

BACKGROUND

A sway bar (anti-sway bar, roll bar, anti-roll bar, stabilizer bar) is a part of an automobile suspension that reduces the body roll of a vehicle. The sway bar is basically a torsion spring that resists body roll motions. Often, it is formed from a cylindrical steel bar patterned in a "U" shape. A conventional sway bar assembly includes a sway bar and also includes two end links. Typically, the first of the two end links is flexibly coupled to one end of the sway bar, and the second of the two end links is flexibly coupled to the other end of the sway bar. Each of the two end links are then connected to a location on the vehicle near a wheel or axle (such as coupled to a control arm or other suspension feature) at respective left and right sides of the suspension for the vehicle. As a result, when the left and right sides of the suspension move together, the sway bar rotates about its mounting points. However, when the left and right sides of the suspension move relative to one another, the sway bar is subjected to torsion and forced to twist. The twisting of the sway bar transfers the forces between a heavily-loaded suspension side (the side of the vehicle subjected to more roll movement force than the other side of the vehicle) to the opposite, lesser-loaded, suspension side (the side of the vehicle subjected to lesser roll movement force than the other side of the vehicle).

Vehicle suspension systems typically include one or more shock assemblies. In general, a shock assembly includes a spring component or components and a damping component or components that work in conjunction to provide for a comfortable ride, enhance performance of a vehicle, and the like. In general, some or all of the shock assemblies will include a number of different settings, configurations, and the like. As such, a suspension setup (or tune) is always a collection of compromises to achieve performance objectives over a range of different possible encounters. However, as with every collection of compromises, an advancement in one area almost always incurs a new problem or set of problems that require further advancement, analysis, and invention.

BRIEF DESCRIPTION OF THE DRAWINGS

The accompanying drawings, which are incorporated in and form a part of this specification, illustrate embodiments of the present technology and, together with the description, serve to explain the principles of the present technology.

DETAILED DESCRIPTION OF THE EMBODIMENTS

Figure 1A:
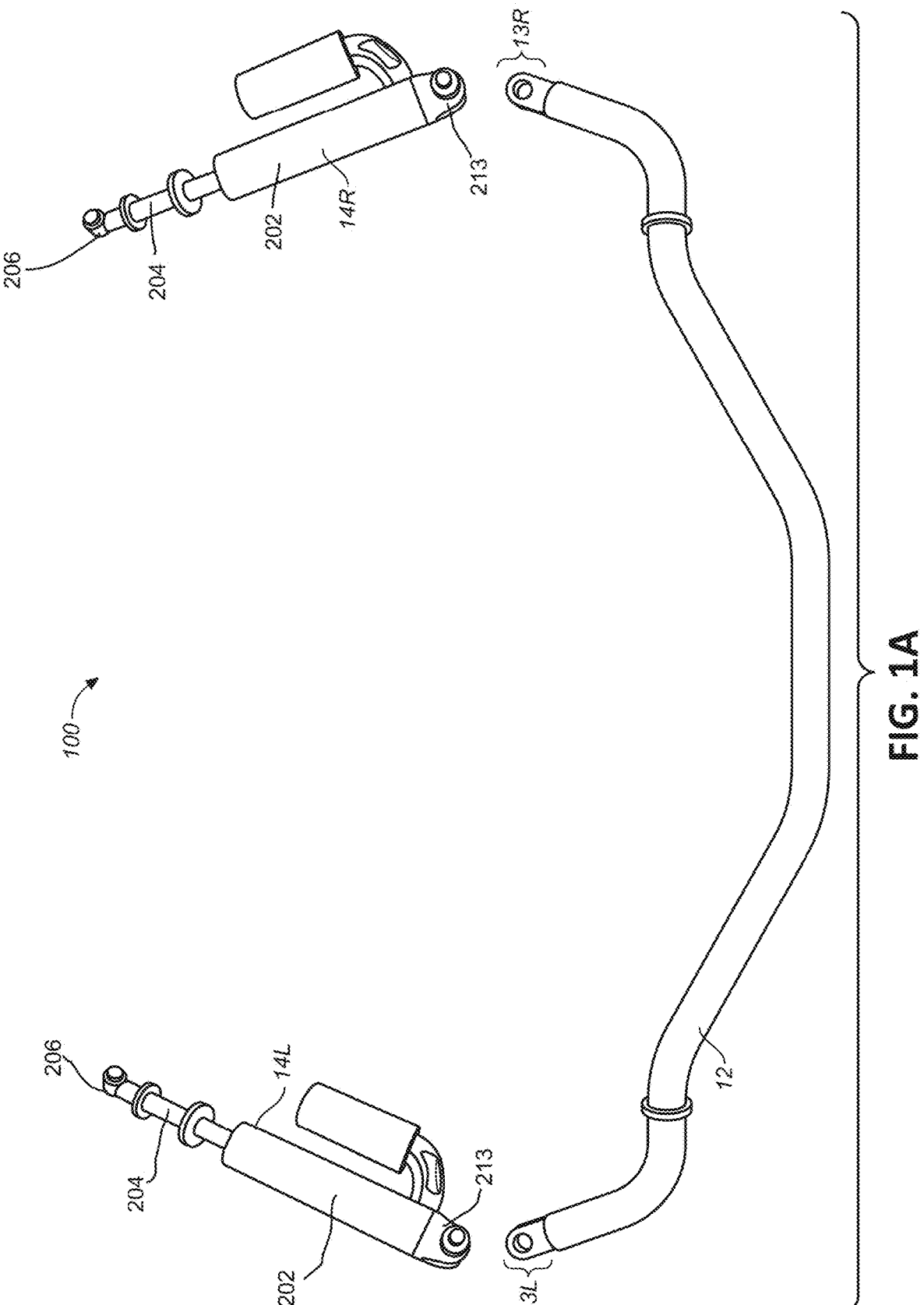
FIG. 1A is a perspective view of a sway bar system including a sway bar and two electronically controlled damper links, in accordance with one embodiment.

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, and objects have not been described in detail as not to unnecessarily obscure aspects of the present disclosure.

In the following discussion, embodiments of the sway bar system (also referred to herein as an "E-Sway Bar" system) are described in detail. As will be described below, embodiments of the sway bar system advantageously enable remote input (e.g., manual remote input or automatic remote input) to manipulate the stiffness of the sway bar system. The stiffness of the sway bar system can be thought of as, for example, a driver's (or passenger's) perception of the "roll stability" of the vehicle. In other words, the perception of the driver (or passenger) of the vehicle for the vehicle to resist or allow "roll motion". As one example, when riding in a vehicle (e.g., a sports car) which appears to provide significant resistance to a rolling motion of the vehicle, it can be said that the vehicle has a "stiff" sway bar system. As another example, when riding in a vehicle (e.g., a motorhome or bus) which appears to not provide significant resistance to a rolling motion of the vehicle, it can be said that the vehicle has a "soft" sway bar system.

It will be understood that a "soft" sway bar system is desired in various conditions. For example, a soft sway bar system provides better vehicle suspension performance during rock crawling and some slow driving activities. However, in a regular or higher speed driving situation, a "soft" sway bar system could make a driver or passengers feel motion sickness, provide a lack of steering control, and ultimately lead to a vehicle rollover or other loss of control accident.

In one embodiment, the physical disconnection of the sway bar from the suspension will provide additional performance enhancements and capabilities during slow maneuvering such as rock crawling, 4-wheeling, and other slower driving/obstacle clearing activities where maximum suspension articulation is desired, needed, and/or warranted. Further, it will be understood that "stiff" sway bar system is desired in various conditions such as normal speed driving, faster speed driving, or driving in a location or conditions that are not rock crawling and other slower driving/obstacle clearing activities, e.g., in locations where maximum articulation is not more important than ensuring the vehicle does not tip over due to body roll, or the like.

In contrast, in one embodiment a "soft" or range of softer settings of a connected sway bar system provides increased handling and body roll control during normal speed cornering and various driving activities. For example, it will be understood that a stiff sway bar system provides increased handling and control during high-speed cornering and various racing activities.

In one embodiment, a "hard" or range of settings from medium to all the way locked out settings of a connected sway bar system will provide increased handling and body roll control during high-speed cornering and various racing activities.

Further, in the following discussion, the term "active", as used when referring to a valve or damping component, means adjustable, manipulatable, etc., during typical operation of the valve. For example, a remotely controllable active valve can have its operation changed to thereby alter a corresponding damping characteristic from a "soft" damping setting to a "firm" damping setting by, for example, adjusting a switch in a passenger compartment of a vehicle. Additionally, it will be understood that in some embodiments, a remotely controllable active valve may also be configured to automatically adjust its operation, and corresponding damping characteristics, based upon, for example, operational information pertaining to the vehicle and/or the suspension with which the valve is used. Similarly, it will be understood that in some embodiments, a remotely controllable active valve may be configured to automatically adjust its operation, and corresponding damping characteristics, to provide damping based upon received user input settings (e.g., a user-selected "comfort" setting, a user-selected "sport" setting, and the like). Additionally, in many instances, an "active" valve is adjusted or manipulated electronically (e.g., using a powered solenoid, or the like) to alter the operation or characteristics of a valve and/or other component. As a result, in the field of suspension components and valves, the terms "active", "electronic", "electronically controlled", and the like, are often used interchangeably.

In the following discussion, the term "manual" as used when referring to a valve or damping component means manually adjustable, physically manipulatable, etc., without requiring disassembly of the valve, damping component, or suspension damper which includes the valve or damping component. In some instances, the manual adjustment or physical manipulation of the valve, damping component, or suspension damper, which includes the valve or damping component, occurs when the valve is in use. For example, a manual valve may be adjusted to change its operation to alter a corresponding damping characteristic from a "soft" damping setting to a "firm" damping setting by, for example, manually rotating a knob, pushing or pulling a lever, physically manipulating an air pressure control feature, manually operating a cable assembly, physically engaging a hydraulic unit, and the like. For purposes of the discussion, such instances of manual adjustment/physical manipulation of the valve or component can occur before, during, and/or after "typical operation of the vehicle".

It should further be understood that a vehicle suspension may also be referred to using one or more of the terms "passive", "active", "semi-active" or "adaptive". As is typically used in the suspension art, the term "active suspension" refers to a vehicle suspension which controls the vertical movement of the wheels relative to vehicle. Moreover, "active suspensions" are conventionally defined as either a "pure active suspension" or a "semi-active suspension" (a "semi-active suspension" is also sometimes referred to as an "adaptive suspension"). In a conventional "pure active suspension", a motive source such as, for example, an actuator, is used to move (e.g., raise or lower) a wheel with respect to the vehicle. In a "semi-active suspension", no motive force/actuator is employed to adjust move (e.g., raise or lower) a wheel with respect to the vehicle. Rather, in a "semi-active suspension", the characteristics of the suspension (e.g., the firmness of the suspension) are altered during typical use to accommodate conditions of the terrain and/or the vehicle. Additionally, the term "passive suspension", refers to a vehicle suspension in which the characteristics of the suspension are not changeable during typical use, and no motive force/actuator is employed to adjust move (e.g., raise or lower) a wheel with respect to the vehicle. As such, it will be understood that an "remotely controllable active valve", as defined above, is well suited for use in a "pure active suspension" or a "semi-active suspension".

In one embodiment, the damping characteristic of at least one damper is obtained by controlling a remotely adjustable remotely controllable active valve (may also be referred to as a remotely adjustable electronic valve or, more concisely, as just an remotely controllable active valve) of the damper, wherein the remotely adjustable remotely controllable active valve utilizes a relatively small solenoid (using relatively low amounts of power) to generate relatively large damping forces. Examples of such a remotely controllable active and semi-active valves and their features are described and shown in U.S. Pat. Nos. 8,627,932; 8,857,580; 9,033,122; 9,120,362; and 9,239,090 the content of which are incorporated by reference herein, in their entirety.

Referring now to FIG. 1A, a perspective view of a sway bar system 100 including a sway bar 12 and two electronically controlled damper links, 14L and 14R, is shown in accordance with one embodiment. For purposes of clarity, in FIG. 1A, electronically controlled damper link 14L and electronically controlled damper link 14R are shown slightly separated from sway bar 12 in order to more clearly depict the location of connection 13L, where electronically controlled damper link 14L couples to sway bar 12, and to more clearly depict the location, 13R, where electronically controlled damper link 14R couples to sway bar 12. In various embodiments of sway bar system 100, an upper portion of electronically controlled damper link 14L includes a bushing, or similar coupling feature, to readily enable coupling of electronically controlled damper link 14L to, for example, at connection 13L of sway bar 12. Similarly, in various embodiments of sway bar system 100, an upper portion of electronically controlled damper link 14R includes a bushing, or similar coupling feature, to readily enable coupling of electronically controlled damper link 14R to, for example, 13R of sway bar 12. It should be noted that sway bar system 100 is not limited solely to the use of a bushing for coupling one or both of electronically controlled damper link 14L and electronically controlled damper link 14R to sway bar 12.

With reference still to FIG. 1A, in various embodiments of sway bar system 100, a lower portion of electronically controlled damper link 14L includes an eyelet, or similar coupling feature, to readily enable coupling of electronically controlled damper link 14L to a location on a vehicle. Similarly, in various embodiments of sway bar system 100, a lower portion of electronically controlled damper link 14R includes an eyelet, or similar coupling feature, to readily enable coupling of electronically controlled damper link 14R to a location on a vehicle. It should be noted that sway bar system 100 is not limited solely to the use of an eyelet for coupling one or both of electronically controlled damper link 14L and electronically controlled damper link 14R to a vehicle.

Although the embodiment of FIG. 1A, depicts sway bar system 100 having two electronically controlled damper links 14L and 14R, in another embodiment, sway bar system 100 includes only a single electronically controlled damper link (e.g., only 14L or only 14R). In such an embodiment, an electronically controlled damper link (e.g., 14L or 14R) is coupled to one end (e.g., a first end) of sway bar 12, and, for example, a conventional end link is coupled to the other end (e.g., a second end) of sway bar 12. Hence, sway bar system 100 is well suited to embodiments in which one end of sway bar 12 has an electronically controlled damper link (e.g., 14L or 14R) coupled thereto, and also to embodiments in which both ends of sway bar 12 have an electronically controlled damper link (e.g., 14L and 14R, respectively) coupled thereto. Additionally, for purposes of conciseness and clarity, portions of the following description may refer to an electronically controlled damper link as "electronically controlled damper link 14", instead repeating the same description for each of electronically controlled damper link 14L and electronically controlled damper link 14R. It should be noted that such portions of the description are applicable to either electronically controlled damper link 14L or electronically controlled damper link 14R, as shown in sway bar system 100 of FIG. 1A. Further, the description will pertain to embodiments in which one end of sway bar 12 has an electronically controlled damper electronically controlled damper link (e.g., 14L or 14R) coupled thereto, and also to embodiments in which both ends of sway bar 12 have an electronically controlled damper link (e.g., 14L and 14R, respectively) coupled thereto.

Also included in FIG. 1A are body 202, through shaft 204, connector 206, and connection 213, further discussion of which is provided in the discussion of FIGS. 2-5 herein.

Figure 1B:
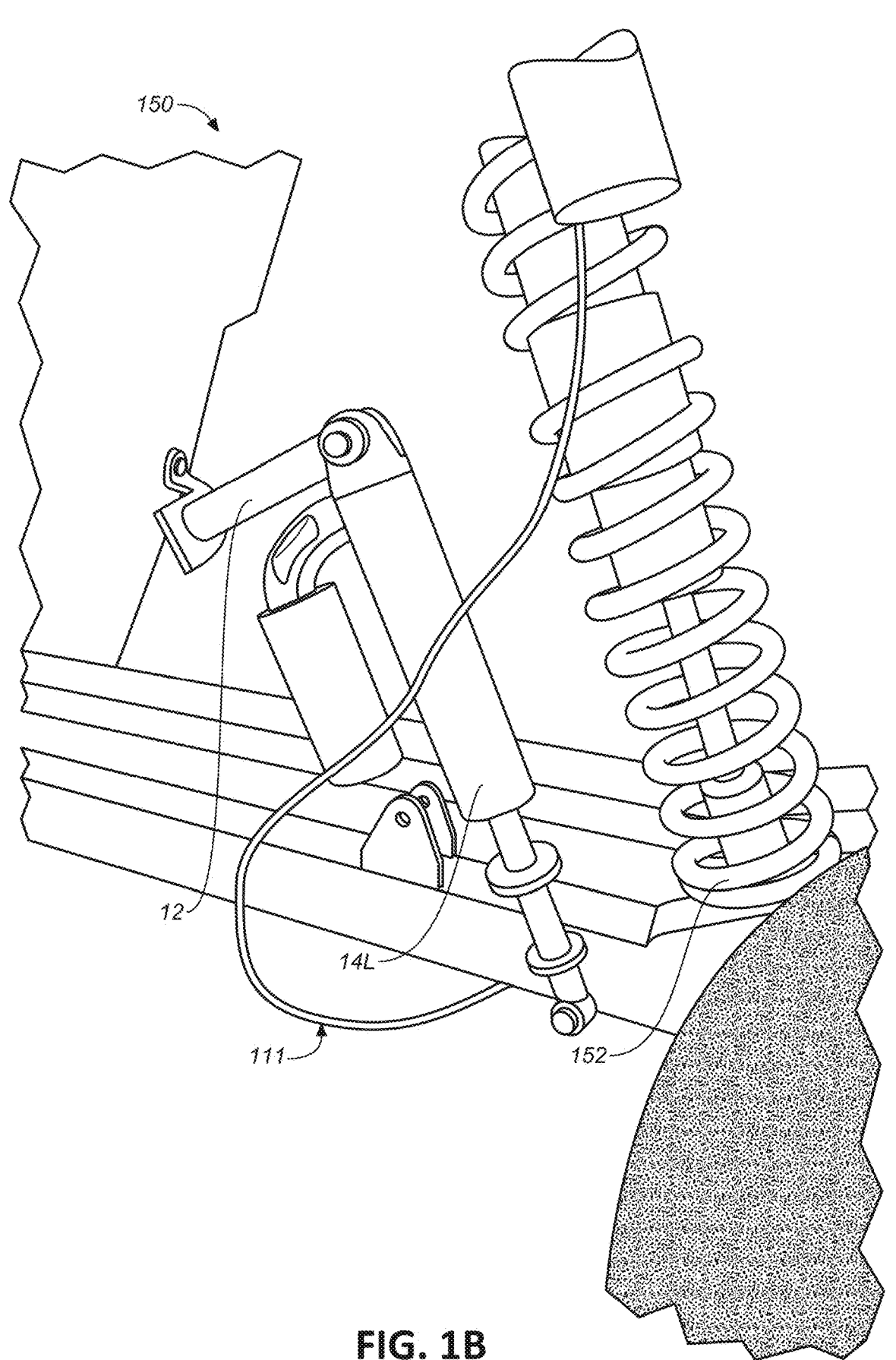
FIG. 1B is a perspective view of sway bar system, of FIG. 1A, installed in a vehicle, in accordance with one embodiment.

With reference now to FIG. 1B, a perspective view 150 is provided of sway bar system 100, of FIG. 1A, installed in a vehicle, in accordance with one embodiment. In the embodiment of FIG. 1B, sway bar 12 and at least one electronically controlled damper link 14L is shown installed in a vehicle 152. In one embodiment, sway bar system 100 is coupled to a vehicle with at least one end of sway bar 12 coupled to the vehicle by an electronically controlled damper link (e.g., 14L or 14R). That is, unlike conventional sway bar assemblies, in one embodiment, sway bar system 100 has one end of sway bar 12 coupled to a vehicle by an electronically controlled damper link (e.g., 14L or 14R).

In one embodiment, sway bar system 100 has both ends of sway bar 12 coupled to a vehicle by an electronically controlled damper link (e.g., 14L and 14R, respectively). As a result, and as will be described further below, the "stiffness" provided by sway bar system 100 can be remotely controlled by controlling the stiffness or compliance of one or both of electronically controlled damper links 14L and 14R coupling sway bar 12 to a vehicle. Importantly, FIG. 1B further shows cable 111. Cable 111 is used to provide input to electronically controlled damper link 14. Such input is used to control the damping characteristics of electronically controlled damper link 14. In various embodiments, as are described below in detail, such input may consist of electrical input (based upon, e.g., user input, sensors-derived data, or any of various other sources) used to control an electronic valve within electronically controlled damper link 14 and, correspondingly, control the damping characteristics of electronically controlled damper link 14. Embodiments of the sway bar system 100 are also well suited to using a wireless signal (in addition to, or in lieu of, cable 111) to control a valve or other component of electronically controlled damper link 14 such that, ultimately, the damping characteristic of electronically controlled damper link 14 is controllable.

Figure 1C:
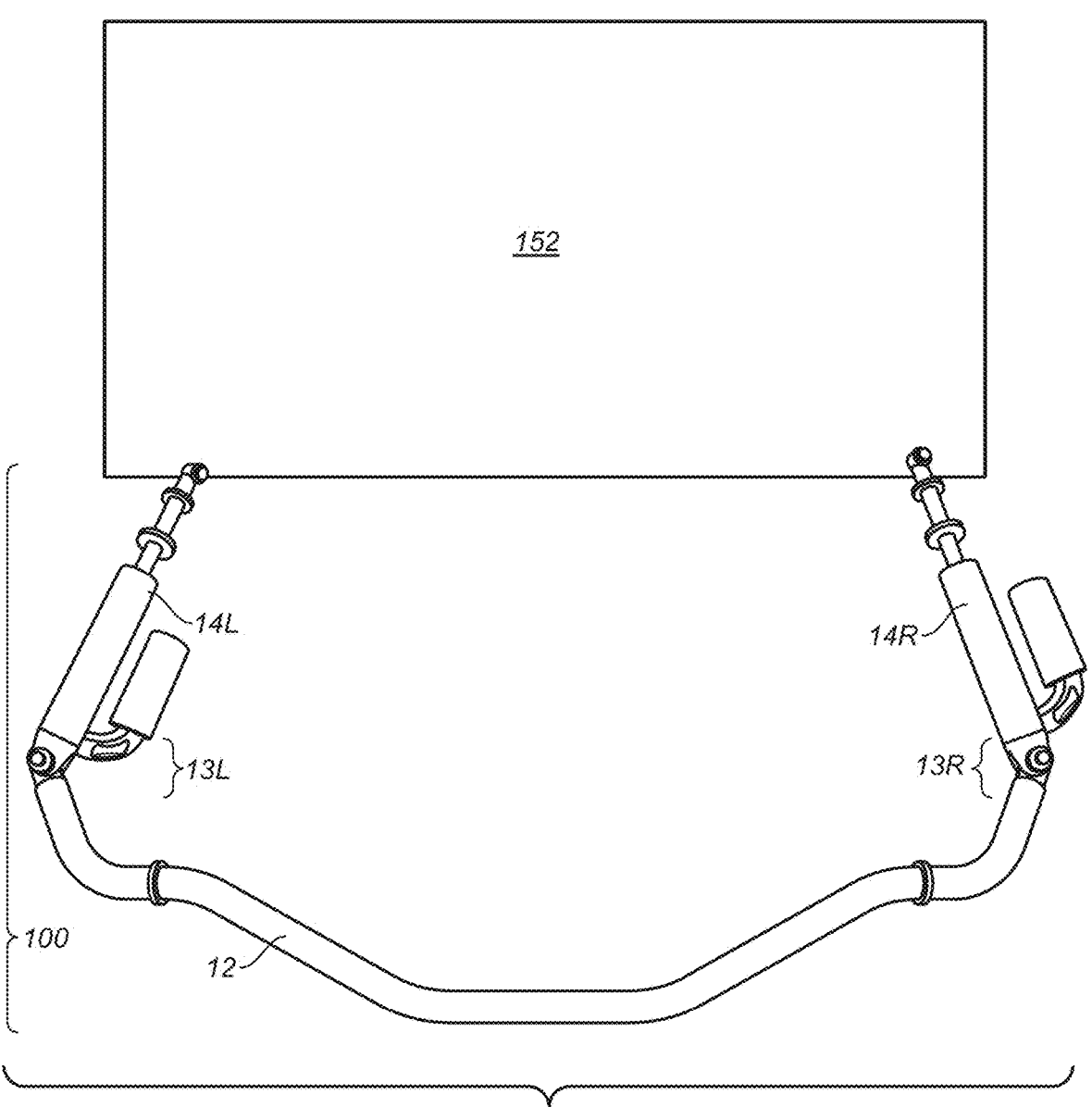
FIG. 1C is a perspective view is provided of sway bar system having electronically controlled damper link coupled to a first end of sway bar.

Referring now to FIG. 1C, a perspective view is provided of sway bar system 100 having electronically controlled damper link 14L coupled to a first end of sway bar 12 at location 13L. In the embodiment of FIG. 1C, sway bar system 100 further includes electronically controlled damper link 14R coupled to a second end of sway bar 12 at location 13R. Additionally, as schematically depicted in FIG. 1C, in the embodiment, electronically controlled damper link 14L is coupled to vehicle 152, and electronically controlled damper link 14R is coupled to vehicle 152. In one embodiment, electronically controlled damper link 14L and electronically controlled damper link 14R are coupled to vehicle 152 at a location, for example, near a wheel or axle (such as coupled to a control arm or other suspension feature) of vehicle 152 at respective left and right sides of vehicle 152. It will be understood that when the left and right sides of the suspension of vehicle 152 move relative to one another, sway bar 12 of sway bar system 100 is subjected to torsion and forced to twist. The twisting of sway bar 12 will transfer forces between a heavily-loaded suspension side of vehicle 152 to the opposite, lesser-loaded, suspension side of vehicle 152.

Figure 1D:
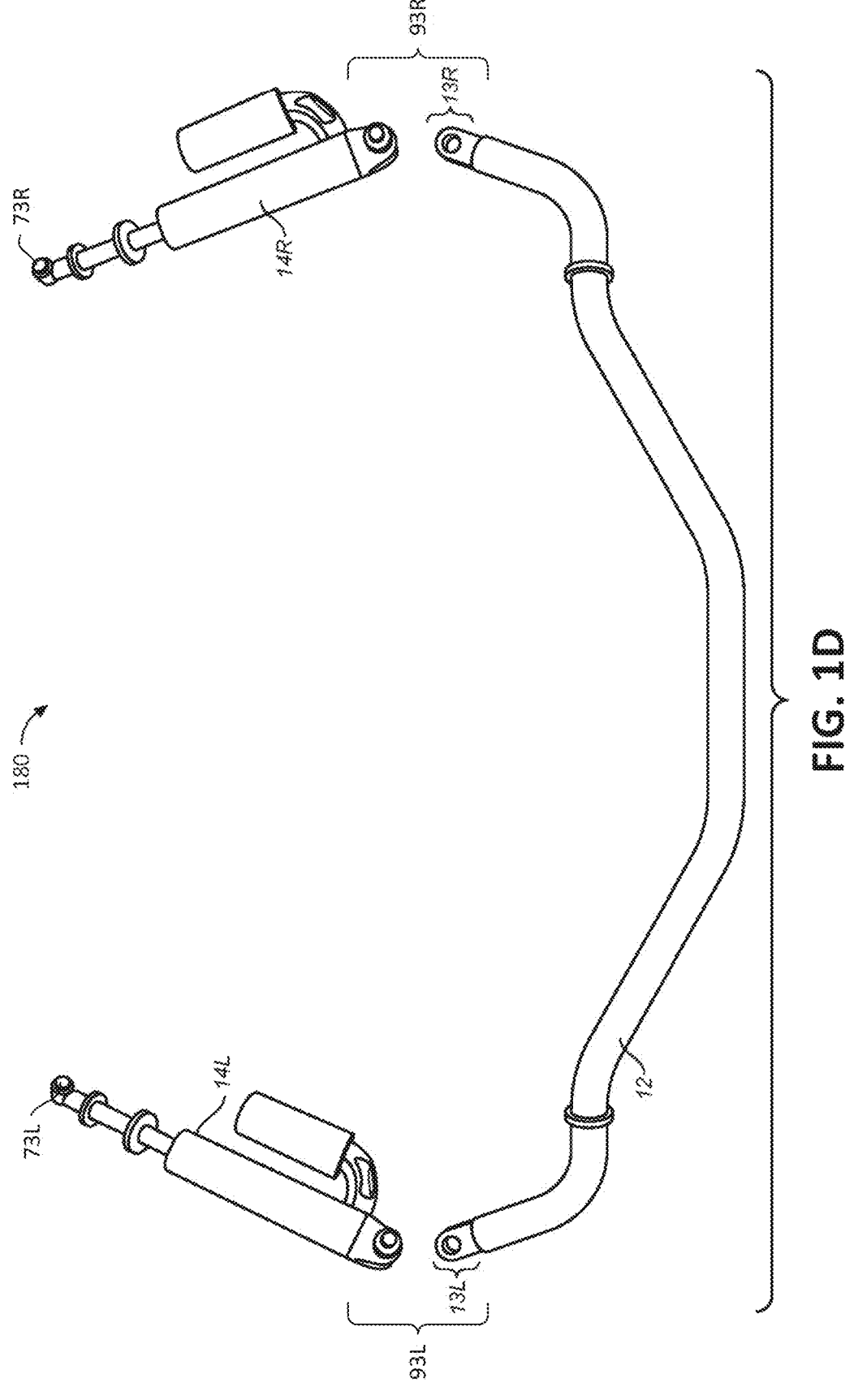
FIG. 1D is a perspective view of a sway bar system including a sway bar, two electronically controlled damper links, and two electronically controlled physical disconnects, in accordance with one embodiment.

Referring now to FIG. 1D, a perspective view of a sway bar system 180 including a sway bar 12, two electronically controlled damper links, e.g., electronically controlled damper link 14L and electronically controlled damper link 14R, and two electronically controlled physical disconnects, e.g., electronically controlled physical disconnect 93R and electronically controlled physical disconnect 93L, are shown in accordance with one embodiment. Although two electronically controlled physical disconnects are shown in FIG. 1D, it is appreciated that in another embodiment, sway bar 12 would have only a single electronically controlled physical disconnect, or a plurality of electronically controlled physical disconnect. Further, although two electronically controlled damper links are shown in FIG. 1D, it is appreciated that in another embodiment, sway bar 12 would have no electronically controlled damper links, one electronically controlled damper link, or a plurality of electronically controlled damper links.

For purposes of clarity, in FIG. 1D, electronically controlled damper link 14L and electronically controlled damper link 14R are shown slightly separated from sway bar 12 in order to more clearly depict the location of electronically controlled physical disconnect 93L, where electronically controlled damper link 14L would, in one embodiment, be physically coupled with, or physically disconnected from, sway bar 12 at connection 13L; and to more clearly depict the location of electronically controlled physical disconnect 93R, where electronically controlled damper link 14R would, in one embodiment, be physically coupled with, or physically disconnected from, sway bar 12 at connection 13R.

In one embodiments of sway bar system 180, electronically controlled physical disconnect 93L includes a linear actuator, rotary actuator, or other electronically controllable coupling feature (similar in functionality to the solenoid valve operation disclosed in remotely controllable active valve), to allow electronically controlled damper link 14L to be physically coupled with and physically disconnected from, sway bar 12 at connection 13L. Similarly, in one embodiments of sway bar system 180, electronically controlled physical disconnect 93R includes a linear actuator, rotary actuator, or other electronically controllable coupling feature (similar in functionality to the solenoid valve operation disclosed in remotely controllable active valve), to allow electronically controlled damper link 14R to be physically coupled with and physically disconnected from, sway bar 12 at connection 13R. It should be noted that in one embodiment, sway bar system 180 is not limited solely to the use of a bushing for electronically controlled physical disconnect 93L or electronically controlled physical disconnect 93R.

With reference still to FIG. 1D, in one embodiment of sway bar system 180, a portion of electronically controlled damper link 14L includes an eyelet 73L, or similar coupling feature, to readily enable coupling of electronically controlled damper link 14L to a location on a vehicle. Similarly, in one embodiment of sway bar system 180, a portion of electronically controlled damper link 14R includes an eyelet 73R, or similar coupling feature, to readily enable coupling of electronically controlled damper link 14R to a location on a vehicle. It should be noted that one embodiment of sway bar system 180 uses a connection other than an eyelet for coupling one or both of electronically controlled damper link 14L and electronically controlled damper link 14R to a vehicle.

In one embodiment, the electronically controlled physical disconnect 93L (or electronically controlled physical disconnect 93R) is a portion of electronically controlled damper link 14L (or electronically controlled damper link 14R, respectively).

In one embodiment, electronically controlled physical disconnect 93L (or electronically controlled physical disconnect 93R) is a portion of electronically controlled damper link 14L (or electronically controlled damper link 14R, respectively) located at an opposite end of the eyelet 73L (or eyelet 73R, respectively) portion of electronically controlled damper link 14L (or electronically controlled damper link 14R, respectively).

Although, in one embodiment, sway bar system 180 is disclosed as having two electronically controlled damper links and two electronically controlled physical disconnects, it should be appreciated that other embodiments of sway bar system 180 would include a different number of electronically controlled damper links and/or electronically controlled physical disconnects, such as a single electronically controlled physical disconnect, or a plurality of electronically controlled physical disconnect, no electronically controlled damper links, one electronically controlled damper link, or a plurality of electronically controlled damper links, and the combinations therefrom as discussed in some of the examples below. Further, it should be understood that the following embodiments are provided for clarity, and are not meant to be exhaustive. Instead, one or more embodiments could include other configurations, additional electronically controlled damper links and/or electronically controlled physical disconnects which may be located at different locations along sway bar 12, and the like.

For example, in one embodiment, sway bar system 180 includes only a single electronically controlled damper link (e.g., electronically controlled damper link 14L or electronically controlled damper link 14R), and both of electronically controlled physical disconnect 93R and electronically controlled physical disconnect 93L. In one example of such an embodiment, electronically controlled damper link 14L is used at one end of sway bar 12 such as to couple with connection 13L, and a conventional end link (or the like) is coupled to the other connection 13R. Hence, sway bar system 180 is well suited to embodiments in which one end of sway bar 12 has an electronically controlled damper link (e.g., electronically controlled damper link 14L or electronically controlled damper link 14R) coupled thereto, and also to embodiments in which both ends of sway bar 12 have an electronically controlled damper link (e.g., electronically controlled damper link 14L and electronically controlled damper link 14R) coupled thereto.

In one embodiment, sway bar system 180 includes only a single electronically controlled damper link (e.g., electronically controlled damper link 14L or electronically controlled damper link 14R), and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and a conventional end link (or the like) is coupled to the other connection 13R without an electronically controlled physical disconnect 93R.

In another embodiment, electronically controlled damper link 14L is used at one end of sway bar 12 such as to couple with connection 13L without an electronically controlled physical disconnect 93L, and a conventional end link (or the like) is coupled to the other connection 13R having electronically controlled physical disconnect 93R.

In one embodiment, sway bar system 180 includes both electronically controlled damper link 14L and electronically controlled damper link 14R, and only a single electronically controlled physical disconnect (e.g., electronically controlled physical disconnect 93R or electronically controlled physical disconnect 93L). In one example of such an embodiment, electronically controlled damper link 14L is used at one end of sway bar 12 such as to couple with connection 13L via electronically controlled physical disconnect 93L, and electronically controlled damper link 14R is coupled to the other connection 13R without an electronically controlled physical disconnect 93R.

In another example of such an embodiment, electronically controlled damper link 14L is used at one end of sway bar 12 such as to couple with connection 13L via without an electronically controlled physical disconnect 93L, and electronically controlled damper link 14R is coupled to the other connection 13R via electronically controlled physical disconnect 93R.

As such, sway bar system 180 is well suited to embodiments in which one or both ends of sway bar 12 have an electronically controlled damper links coupled thereto, and also to embodiments in which one or both ends of sway bar 12 are coupled to one or more electronically controlled damper links (and/or a conventional end link) via one or both of electronically controlled physical disconnects.

For purposes of conciseness and clarity, portions of the following description may refer to the electronically controlled physical disconnect as "electronically controlled physical disconnect 93", instead repeating the same description for each of electronically controlled physical disconnect 93L and electronically controlled physical disconnect 93R. It should be noted that such portions of the description are applicable to either electronically controlled physical disconnect 93L or electronically controlled physical disconnect 93R, as shown in sway bar system 180 of FIG. 1D. Further, the description will pertain to embodiments in which one or both ends of sway bar 12 have electronically controlled physical disconnects coupled therewith, and also to embodiments in which one or both ends of sway bar 12 are coupled to one or more electronically controlled damper links (and/or a conventional end link) via one or both of electronically controlled physical disconnects.

Typically, sway bars can become expensive due to needing sensors to aid in the centering of the sway bar. For instance, when going from a disconnected state to a connected state a lot of sway bar systems need sensors to aid in balancing the forces to where the sway bar is level. There is also the possibility of the sway bar not being level when reconnecting if the wheels are not level.

In general, a suspension system for a vehicle provides a motion modifiable connection between a portion of the vehicle that is in contact with a surface (e.g., an unsprung portion) and some or all of the rest of the vehicle that is not in contact with the surface (e.g., a suspended portion). For example, the unsprung portion of the vehicle that is in contact with the surface can include one or more wheel(s), skis, tracks, hulls, etc., while some or all of the rest of the vehicle that is not in contact with the surface include suspended portions such as a frame, a seat, handlebars, engines, cranks, etc.

The suspension system will include one or numerous components which are used to couple the unsprung portion of the vehicle (e.g., wheels, skids, wings, belt, etc.) with the suspended portion of the vehicle (e.g., seat, cockpit, passenger area, cargo area, etc.). Often, the suspension system will include one or more shock assemblies which are used to reduce feedback from the unsprung portion of the vehicle before that feedback is transferred to the suspended portion of the vehicle, as the vehicle traverses an environment. However, the language used by those of ordinary skill in the art to identify a shock assembly used by the suspension system can differ while referring to the same (or similar) types of components. For example, some of those of ordinary skill in the art will refer to the shock assembly as a shock absorber, while others of ordinary skill in the art will refer to the shock assembly as a damper (or damper assembly).

In its basic form, the suspension is used to increase ride comfort, performance, endurance, component longevity and the like. In general, the force of jarring events, rattles, vibrations, jostles, and the like which are encountered by the portion of the vehicle that is in contact with the surface are reduced or even removed as it transitions through the suspension before reaching suspended portions of the vehicle to include components such as seats, steering wheels/handlebars, pedals/foot pegs, fasteners, drive trains, engines, and the like.

For example, on a wheeled vehicle, a portion of the wheel (or tire) will be in contact with the surface being traversed (e.g., pavement, dirt, gravel, sand, mud, rocks, etc.) while a shock assembly and/or other suspension system components will be coupled between a wheel retaining assembly and the suspended portion of the vehicle (often a portion of the vehicle frame and associated systems, the seat, handlebars, pedals, controls, steering wheel, interior, etc.).

In a snow machine, a portion of the track and/or the skis that will be in contact with the surface being traversed (e.g., snow, ice, etc.) while a shock assembly and/or other suspension components will be coupled between a track retaining assembly (and similarly the skis retaining assembly) and the suspended portion of the vehicle (usually including the engine and associated systems, the seat, handlebars, etc.).

In a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like).

In an airplane in flight, it is the airframe that is in contact with the surface being traversed (e.g., the air) while a shock assembly and/or other suspension components will be coupled between the airframe and the suspended portion(s) of the vehicle (such as the seats and the like).

As vehicle utilization scenarios change, one or more shock assemblies of the suspension system can be adjusted for different characteristics based on the use type of the vehicle, terrain, purpose (e.g., rock crawl, normal use, race set-up, etc.), and the like. For example, a downhill mountain bike rider (motocross rider, off-road truck driver, side-by-side rider, snow machine racer, etc.) would want a suspension configuration with a large range of motion and aggressive rebound and compression speeds to maintain as much contact as possible between the tires and the ground by absorbing the terrain events such as bumps, ruts, roots, rocks, dips, etc. while reducing the impacts felt at the suspended portion and also have the suspension return to its SAG setting as quickly as possible in preparation for the next encounter.

In contrast, a street bike racer (track racing vehicle, boat/PWC racer, etc.) would want a firmer suspension configuration with a very small range of motion to provide feel for the grip of the tire, maintain friction and/or aerodynamic geometries, and the like, in order to obtain the maximum performance from the vehicle.

In a normal use scenario, such as a trip to the local store, a ride around town or on a path, a drive to grandma's house, a boat ride out on a lake, etc., one choice for the suspension configuration would be based on providing the most comfort.

In one embodiment, there may be times where changes to a suspension component are desired during a given ride/ drive. For example, a bike rider in a sprinting scenario would often want to firm up or possibly even lockout the suspension component to remove the opportunity for rider induced pedal bob. Similarly, a ride/drive from a paved road to an off-road environment (or vice-versa) would also be a time when a change to one or more suspension component settings is valuable.

With respect to the term lockout, for purposes of the following discussion, lockout refers to the most restricted flow state attainable or desirable. Thus, in one embodiment, lockout refers to a stoppage of all fluid flow through a given fluid path. However, in another embodiment, lockout does not stop all the fluid flow through a given fluid path. For example, a manufactured component may not be able to stop all fluid flow due to tolerances, or a manufacturer (designer, etc.) may not want to stop all fluid flow for reasons such as lubrication, cooling, etc. Similarly, a lockout state could be a "perceived lockout"; that is, the flow area through a flow path of the shock assembly has been reduced to a minimum size for a given shock assembly, machine, environment, speed, performance requirement, etc. For example, in one "perceived lockout" most, but not all, of the fluid flow is minimized while in another "perceived lockout" the fluid flow is reduced by only half (or a third, quarter, three-quarters, or the like).

In the following discussion, the term ride height refers to a distance between a portion of a vehicle and the surface across which the vehicle is traversing. Often, ride height is based on one or more of a number of different measurements such as, but not limited to, a distance between a part of the vehicle and the ground, a measurement between the top of an unsprung portion of a vehicle and a suspended portion of the vehicle there above, etc. For example, a portion of the wheel(s) (or ski, track, hull, etc.) will be in contact with the surface, while one or more shock assemblies and/or suspension components maintain the suspended portion of the vehicle a certain height there above.

In one embodiment using a wheeled vehicle example, a portion of the wheel will be in contact with the surface while a shock assembly and/or other suspension components will be coupled between a wheel retaining assembly and the suspended portion of the vehicle (often a portion of the vehicle frame). The ride height is established by the geometries of the shock assembly and/or other suspension components, the wheel retaining assembly, the wheel and tire profile, and the like.

Similarly, in a snow machine, a portion of the track (and similarly the skis) will be in contact with the surface while a shock assembly and/or other suspension components will be coupled between a track retaining assembly (and similarly the skis retaining assembly) and the suspended portion of the vehicle (often a portion of the vehicle frame). Here again, the ride height is established by the geometries of the shock assembly and/or other suspension components, the track and ski retaining assemblies, the track and/or ski profile, and the like.

In one embodiment, such as a boat or PWC vehicle, a portion of the hull will be in contact with the surface of the water while a shock assembly and/or other suspension components will be coupled between the hull and the suspended portion(s) of the vehicle (such as the seat, the handlebars, a portion of the vehicle frame, and/or the like). Here again, the ride height is established by the geometries of the shock assembly and/or other suspension components, with respect to the hull and the suspended portion(s) of the vehicle.

The term initial SAG settings or "SAG" refers to a pre-defined vehicle ride height and suspension geometry based on the initial compression of one or more shock assemblies of the suspension system for a given vehicle when it is within its normal load envelope configuration (e.g., with a rider/driver and any initial load weight). Once the SAG is established for a vehicle, it will be the designated ride height of the vehicle, until and unless the SAG is changed.

The initial SAG for a vehicle is usually established by the manufacturer. The vehicle SAG can then be modified and/or adjusted by an owner, a mechanic, or the like. For example, an owner can modify the SAG to designate a new normal ride height based on a vehicle use purpose, load requirements that are different than the factory load configuration, an adjustment modification and/or replacement of one or more of the suspension components, a change in tire size, a performance adjustment, aesthetics, and the like.

In one embodiment, the initial manufacturer will use SAG settings resulting in a pre-established vehicle ride height based on vehicle use, size, passenger capacity, load capacity, and the like. For example, a truck (side-by-side, car, or the like) may have a pre-established SAG based on an expected load (e.g., a number of passengers, an expected cargo requirement, etc.).

Regardless of the vehicle type, once the SAG is established, in a static situation the ride height of the expectedly loaded vehicle should be at or about the established SAG. When in motion, the ride height will change as the vehicle travels over the surface, and while the suspension system is used to reduce the transference of any input forces received from the surface to the rest of the vehicle it is also used to maintain the vehicle's SAG.

However, when additional weight is added to the vehicle, the suspension and one or more shock assemblies will be compressed, and the vehicle ride height will be less than the SAG.

For example, if a vehicle such as a snow machine, PWC, boat, motorcycle, or bicycle is loaded with an additional 100 lbs. of cargo in the rear, the extra 100-pound load will cause shock assembly compression (and the like) thereby causing the vehicle to ride lower in the rear (or to ride in a bow up orientation). In general, skewed rear-low ride height will move the vehicle out of SAG and change the vehicle geometry, e.g., cause a slant upward from rear to front. Often, an out of SAG condition is visually identifiable and in this particular example can result in lightness in steering, rear suspension bottom out, forward visual obstruction, and the like.

In one embodiment, for example in a side-by side that is loaded with 250 lbs. of additional weight, the additional weight will reduce the available operating length of one or more suspension components which can be detrimental to steering and performance characteristics, could cause an unwanted impact between wheel (or wheel suspension) and frame, increase the roughness of the ride, increase suspension stiffness, result in suspension bottom out, loss of control, tire blow out, and the like.

In one embodiment, for example in a truck that is loaded with 500 lbs. of additional weight, when the weight is added to the vehicle, if it is not centered, it will not only cause a change in the front or rear SAG (depending upon the load location fore or aft), but will also cause SAG changes that will differ between the left and right side of the vehicle. For example, if the load is in the rear and off-center to the left, the load-modified ride-height of the vehicle will be lopsided. That is, not only will the rear of the vehicle be lower than the front, but the left-side suspension will also be compressed more than the right-side suspension causing the rear left of the vehicle to have a lower ride-height than the other three corners.

Thus, while the entire rear of the vehicle will be out of SAG and therefore riding lower than the front of the vehicle, it will also be lopsided between the left and right sides. Such lopsided suspension characteristics can be extremely deleterious while driving and will often result in a number of deleterious issues including, but not limited to: steering problems, suspension bottom out, loss of control, tire blow-out, and vehicle rollover.

In contrast to the examples above, when the weight on the vehicle (e.g., rider, passengers, cargo, etc.) is less than the expectedly loaded vehicle weight, the suspension and one or more shock assemblies will be less compressed, and the vehicle ride height will be higher than the SAG. This lighter loaded situation can also result in a number of deleterious issues including, but not limited to: improper seat height (e.g., a rider will be higher off the ground than expected), change in vehicle height clearance, suspension top-out, suspension issues caused by the vehicle operating outside of the operating envelope for the suspension, and the like.

Additional information regarding SAG and SAG setup can be found in U.S. Pat. No. 8,838,335 which is incorporated by reference herein, in its entirety.

A shock assembly often includes a damper body surrounded by or used in conjunction with a mechanical spring or constructed in conjunction with an air spring or both. The shock assembly often consists of a damping piston and piston rod telescopically mounted in a fluid filled cylinder (or damper housing). The damping or working fluid may be, for example, hydraulic oil. A mechanical spring may be a helically wound spring that surrounds or is mounted in parallel with the damper body. As used herein, the terms "down" "up" "downward" upward" "lower" "upper" and other directional references are relative and are used for reference only.

Cross Linked Systems

Due to their size and placement restrictions, sway bars can often have issues when it comes to packaging and complexity. By creating a system that does not require a sway bar, there is the chance for vehicles to run on simpler systems that are also cheaper and easier to manufacture.

The roll, pitch, heave, etc., can be dampened and adjusted by cross linking the wheel suspension systems of a vehicle, as well as the performance improved. By hydraulically cross linking the suspension system, there is also the opportunity for an easy to engage or disengage sway system, as sway bars with such ability can be expensive and complex due to the mechanical linkages.

Cross linking also allows for full articulation of the vehicle wheels, for example when rock crawling there can be instances where, say, the left front tire is compressing the suspension as much as possible while the right front tire is extending the suspension as much as possible.

In one embodiment, the cross linked suspension system does not require a sway bar to be present on the vehicle. In one embodiment, the cross linked suspension system works along with a sway bar on the vehicle.

In one embodiment, the cross linked suspension system is added to a vehicle with a sway bar already installed. In which case, rather than cross linking the shock assemblies that are coupled to the wheels of the vehicle, a new set of shock assemblies are installed to work alongside the sway bar. In one embodiment, the damping rods of the installed shock assemblies are through rods. In one embodiment, by using the hydraulically cross linked system alongside a sway bar, a lighter sway bar can be utilized.

Figure 2:
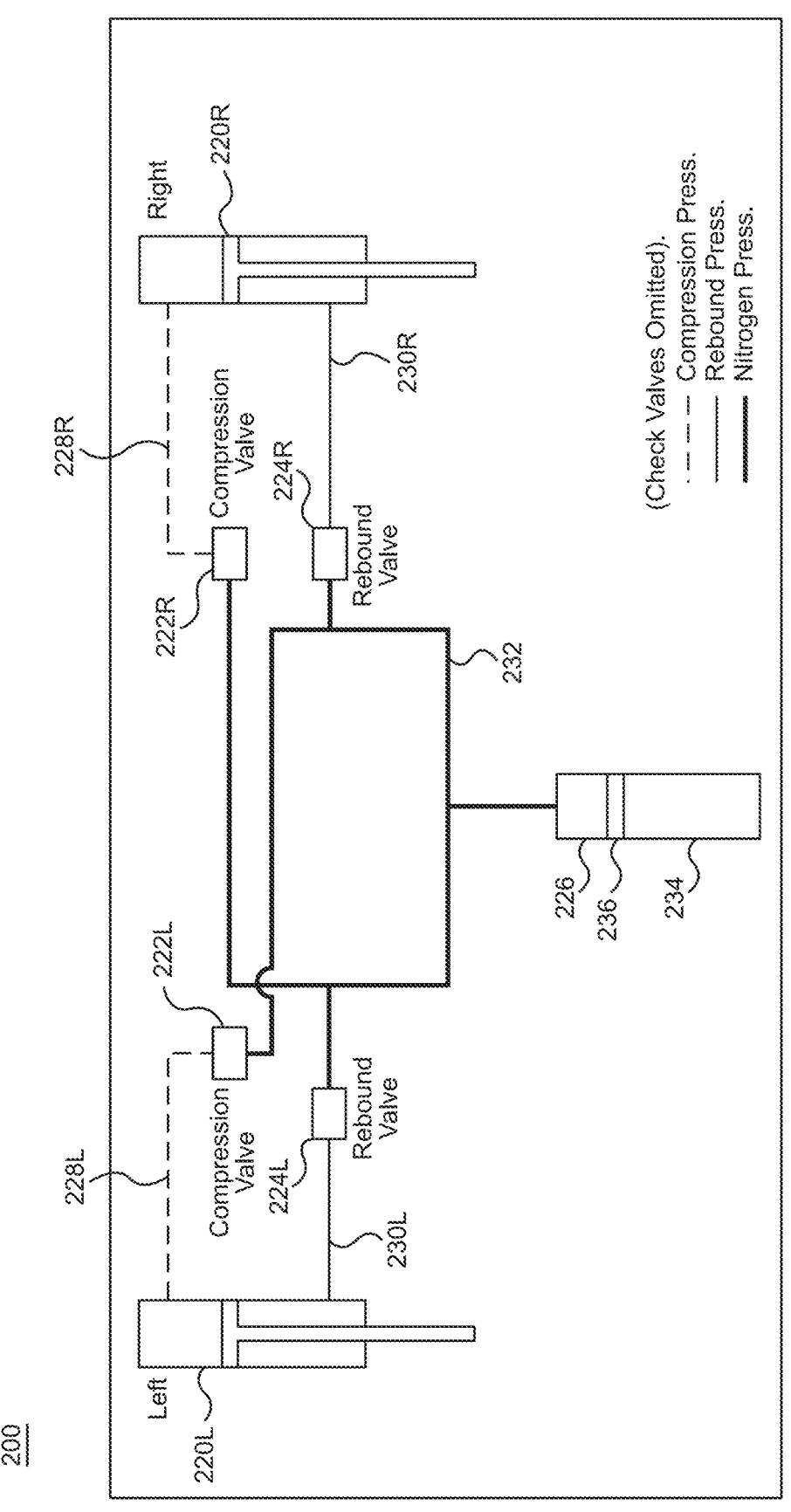
FIG. 2 is a diagram of a hydraulically cross-linked suspension system, in accordance with one embodiment.

FIG. 2 is a diagram of a hydraulically cross linked suspension system 200, in accordance with one embodiment. Also included are the left shock assembly 220L, right shock assembly 220R, left compression valve 222L, right compression valve 222R, left rebound valve 224 L, right rebound valve 224R, and reservoir 226. In one embodiment, the system shown in at least FIG. 2 behaves similarly to two independent shocks and a disengaged sway bar.

For the sake of clarity and brevity, the terms left and right will be used to distinguish the shock assemblies and components in various embodiments, but it should be understood that this may include the front left and right shock assemblies, the rear left and right shock assemblies, or a combination such as the left rear and right front suspension systems and vise versa.

In one embodiment, shock assemblies 200 utilize position sensitive damping such as three port valves. Additional information regarding three port valves can be found in U.S. Patent Application US 2022/0242186 which is incorporated by reference herein, in its entirety. In one embodiment, shock assemblies 200 utilize bypass port pistons. Additional information regarding bypass port pistons can be found in U.S. patent application Ser. No. 17/944,106 which is incorporated by reference herein, in its entirety.

In one embodiment, shock assemblies 220 are hydraulically cross linked. In other words, fluid is shared between the compression chamber of shock assembly 220L and the rebound chamber of shock assembly 220R, and fluid is also shared between the compression chamber of shock assembly 220R and the rebound chamber of shock assembly 220L. During events where both shock assemblies 220 are compressed, the fluid would easily be able to flow between the described connections.

Furthermore, the lines that fluidly couple the compression and rebound chambers are also fluidly coupled to each other via shared reservoir 226 to compensate for shaft-displaced volume. If both shocks 220L and 220R are compressed, oil is displaced by the volume of the shafts entering the shock cylinder. This shaft-displaced oil enters chamber 226. During events where one shock assembly is compressed and the other extended, fluid can instead flow from the shock being compressed to the one being extended. For example, if the left shock assembly 220L is in a compression stroke and the right shock assembly 220R is in a rebound stroke, fluid from the compression chamber of the left shock assembly 220L can flow to the rebound chamber of the left shock assembly 220L.

In one embodiment, compression valve 222L/R is able to meter fluid flow in and out of the compression chamber of shock assembly 220L/R. In one embodiment, rebound valve 224L/R is able to meter fluid flow in and out of the compression chamber of shock assembly 220L/R. In one embodiment, compression valve 222L/R and rebound valve 224L/R use check shims to meter fluid flow. In one embodiment, compression valve 222L/R and rebound valve 224L/R may be a ball valve, needle valve, passive valve, semi active valve, active valve, or the like. In one embodiment, compression valve 222L/R and rebound valve 224L/R utilize a bypass port valve as previously described.

In one embodiment, the check shims in compression valve 222L/R and rebound valve 224L/R only meter fluid flow in a single direction, with free flow in the other direction. In one embodiment, the check shims in compression valve 222L/R and rebound valve 224L/R meter fluid flow in both directions.

In one embodiment, compression line 228L/R is pressurized by the compression chamber of shock assembly 220L/R. In one embodiment, rebound line 230L/R is pressurized by the rebound chamber of shock assembly 220L/R. In one embodiment, shared line 232 is pressurized by gas pressure from gas chamber 234 of reservoir 226. Internal floating piston (IFP) 236 separates the gas chamber 234 from the fluid side. Shared line 232 can also be a port or channel.

One benefit of the embodiment shown in at least FIG. 2 is that there is a single shared reservoir 226.

Figure 3:
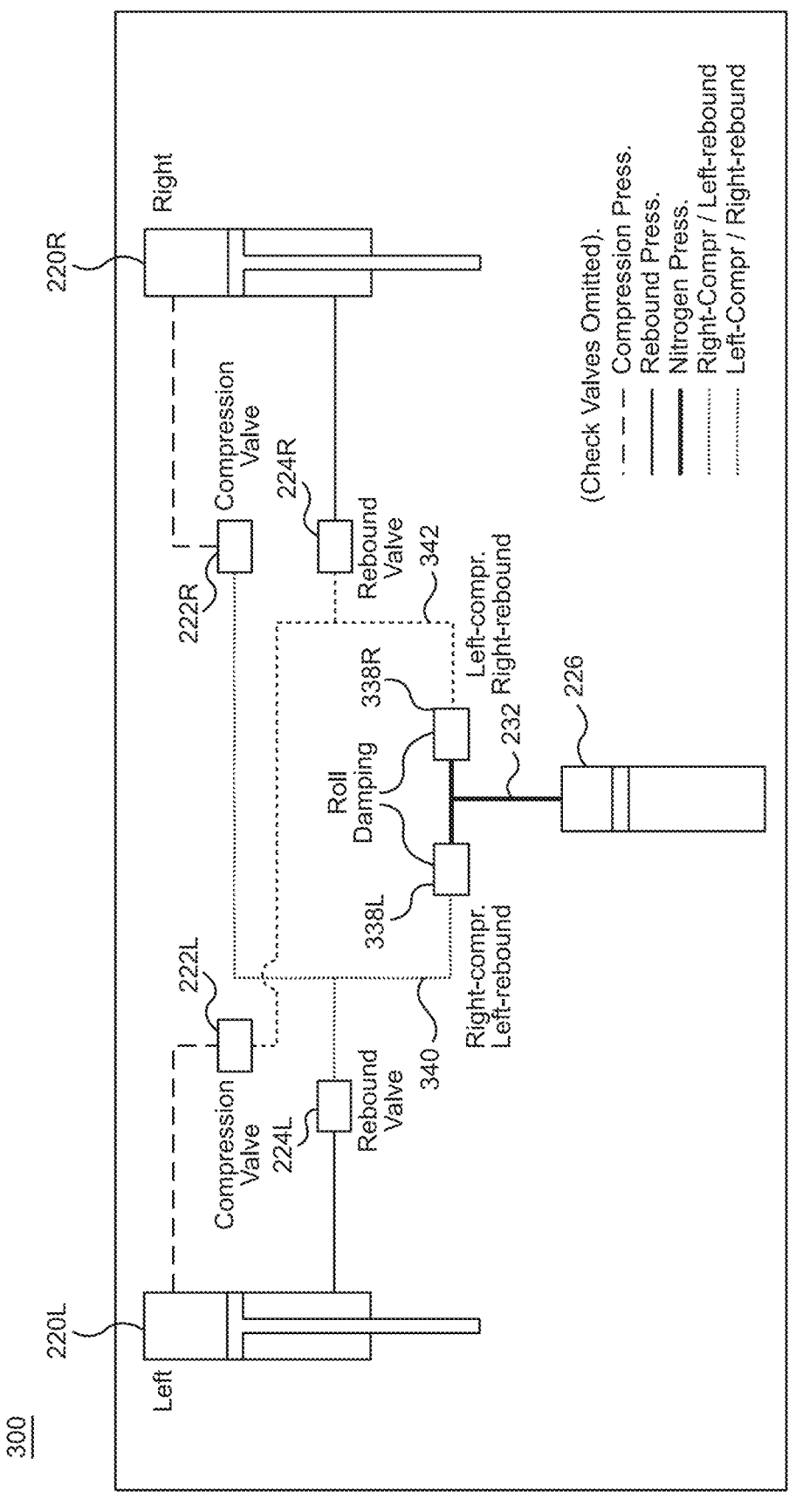
FIG. 3 is a diagram of a hydraulically cross-linked suspension system with roll damping valves, in accordance with one embodiment.

FIG. 3 is a diagram of a hydraulically cross-linked suspension system 300 with roll damping valves 338, in accordance with one embodiment. Suspension system 300 is similar to suspension system 200, but suspension system 300 has additional valving and added benefits. In one embodiment, the system shown in at least FIG. 3 acts like two independent shocks, but with additional roll damping.

In one embodiment, roll damping valves 338L/R are present between the shared line 232 and the compression valve 222L/R and rebound valve 224L/R. In one embodiment, a first line 340 fluidly connects roll damping valve 338L with rebound valve 224L and compression valve 222R, while a second line 342 fluidly connects roll damping valve 338R with rebound valve 224R and compression valve 222L. In one embodiment, 338L/R restricts the flow into reservoir 226 passing through line, port, or channel 232, but allows free flow in the opposite direction out of reservoir 226 into line/port/channels 340 and 342.

In one embodiment, roll damping valve 338L/R assists in adding roll damping functions to the suspension system. In one embodiment, roll damping valve 338L/R can be a passive valve, a semi active valve, or an active valve. In one embodiment, roll damping valve 338L/R utilizes a bypass port piston, as previously described.

In one embodiment, instead of (or in addition to) restricting the flow through the orifice, the active valve can vary a flow rate through an inlet or outlet passage within the active valve, itself. In other words, the active valve can be used to meter the working fluid flow (e.g., control the rate of working fluid flow) with/or without adjusting the flow rate through orifice. Additional information regarding active and semi-active valves, including those used for compression and/or rebound stiffness adjustments, preload adjustments, bottom-out control, preload adjustment, ride height adjustment, and the like see, as an example, U.S. Pat. Nos. 9,353,818 and 9,623,716 the content of which are incorporated by reference herein, in their entirety.

Due to the active valve arrangement, a relatively small solenoid (using relatively low amounts of power) can generate relatively large damping forces. Furthermore, due to incompressible fluid inside the damping assembly, damping occurs as the distance between the cone shaped member and the orifice is reduced. The result is a controllable damping rate. Additional active and semi-active valve features are described and shown in U.S. Pat. Nos. 8,627,932; 8,857,580;

9,033,122; 9,120,362; and 9,239,090 the content of which are incorporated by reference herein, in their entirety.

Figure 4:
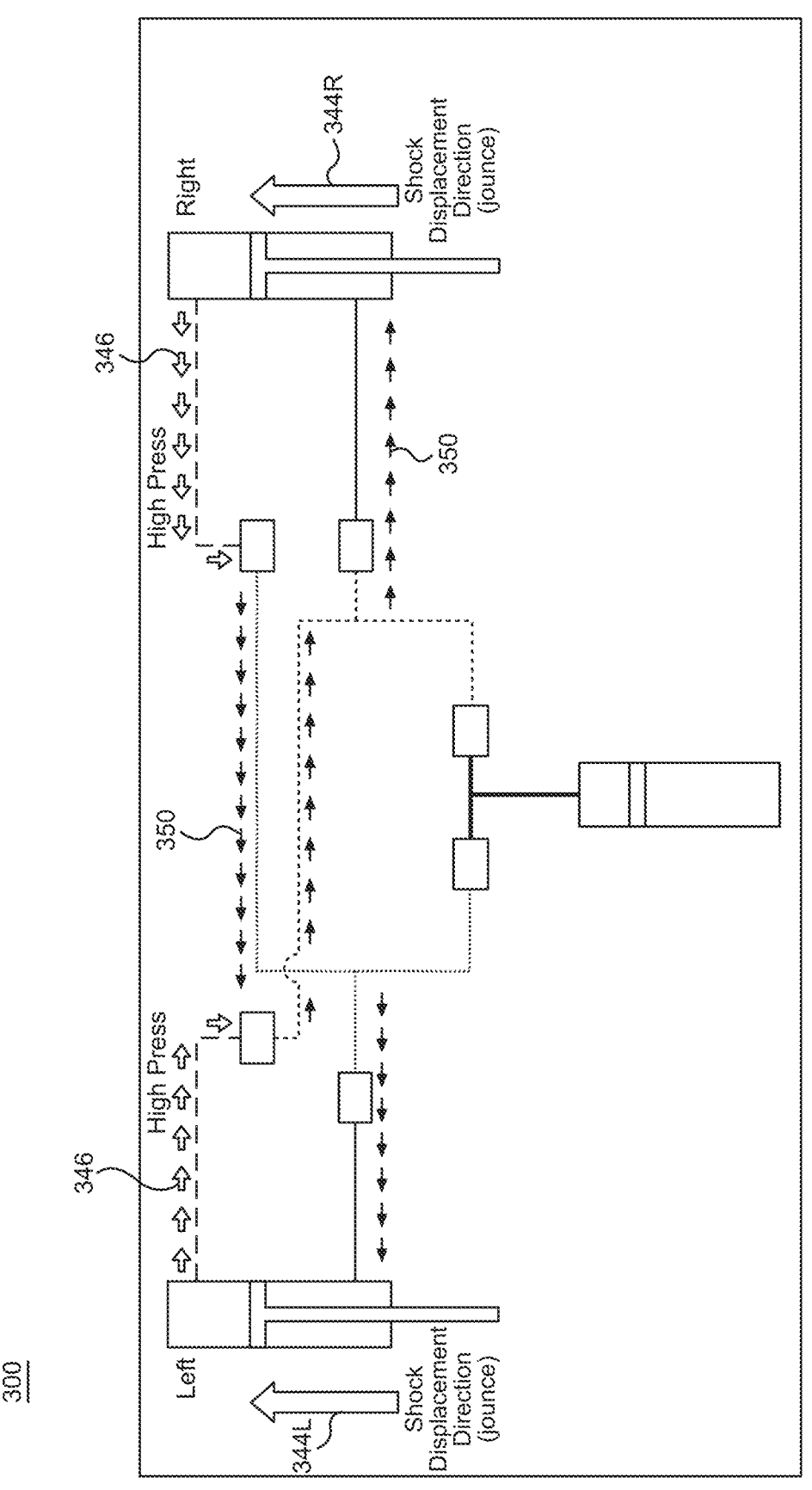
FIG. 4 is a diagram of a hydraulically cross-linked suspension system with roll damping valves during a compression event, in accordance with one embodiment.

FIG. 4 is a diagram of a hydraulically cross-linked suspension system 300 with roll damping valves 338 during a compression event, in accordance with one embodiment. Shock displacement arrows 344L/R show the direction in which shock assembly 220L/R are respectively being influenced (i.e., in compression or rebound). In at least FIG. 4, shock assemblies 220L/R are both in compression.

For the sake of clarity, the relative size of arrows indicating the direction of fluid flow also indicate the relative pressure levels. For example, high pressure arrows 346 show where there is a higher pressure level, and low pressure arrows 350 show the areas with less pressure. In at least FIG. 5, medium pressure arrows 348 show an in-between pressure level.

As seen in at least FIG. 4, there is a high pressure level for the fluid exiting the compression chambers of shock assembly 220L/R due to the presence of compression valves 222L/R. after passing through the compression valves 222L/R and into the first line 340 and second line 342, the pressure level is reduced. Fluid can then easily flow through rebound valves 224L/R and into the rebound chambers of shock assemblies 220L/R.

It should be understood that, due to at least shaft displacement of fluid, some amount of fluid will still pass through roll damping valves 338L/R and into reservoir 226. Thermal expansion can also lead to fluid entering or exiting reservoir 226. In an event such as that shown in at least FIG. 4, there is minimal roll and therefore minimal need for roll damping valves 338L/R to accommodate.

Figure 5:
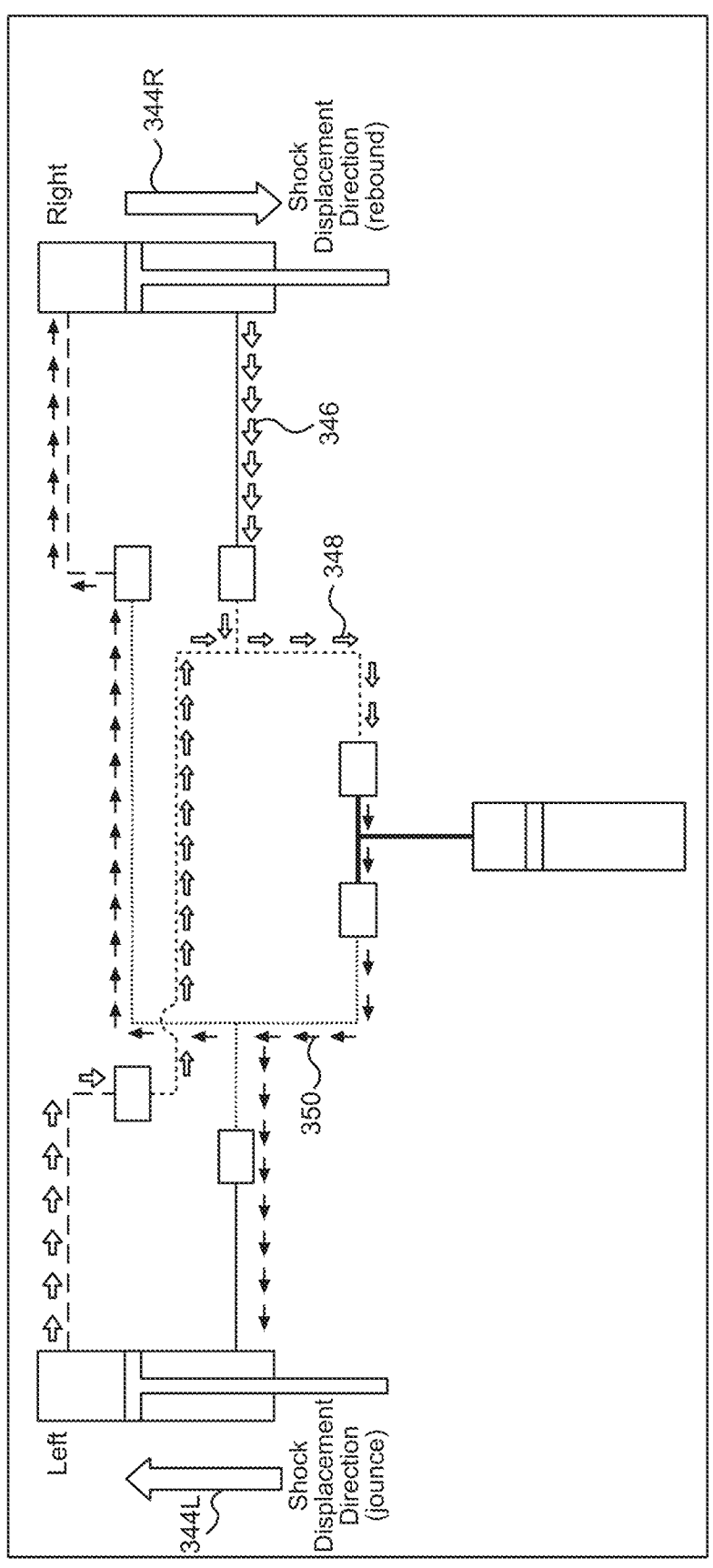
FIG. 5 is a diagram of a hydraulically cross linked suspension system with roll damping valves during a roll event, in accordance with one embodiment.

FIG. 5 is a diagram of a hydraulically cross-linked suspension system 300 with roll damping valves 338 during a roll event, in accordance with one embodiment. One example of a roll event is turning the vehicle. In one embodiment, In one embodiment, roll damping valves 338L/R offer corner damping.

In the example shown in at least FIG. 5, the left shock assembly 220R is being compressed while the right shock assembly 220R is extending (or in a rebound stroke). In this example, there is a high pressure level in compression line 228L and rebound line 230R. Second line 342 has a relatively medium pressure level, while first line 340 has a low pressure level. The pressure differentials cause fluid to flow towards the rebound chamber for shock assembly 220L and the compression chamber of shock assembly 220R.

In one embodiment, as fluid is forced through roll damping valves 338L/R, the upstream pressure is increased. In one embodiment, if the shock displacement speeds are the same then the shaft flow is going from one shock to the other (in the case of at least FIG. 5, the shaft flow is going from shock assembly 220L to shock assembly 220R).

In one embodiment, the level of restriction that roll damping valve 338L/R place on the fluid flow can be adjusted. By adjusting the settings of roll damping valve 338L/R, a tuner or user can change the amount of roll damping independently of other damping directions, such as heave. In one embodiment, the damping settings are tuned to the vehicle, or are a factory default. In one embodiment, a user can control the damping settings via a knob, switch, remote controls, or the like.

In one embodiment, roll damping valve 338L is restrictive when fluid is flowing from the first line 340 to the second line 342 or reservoir 226, and free flowing in the reverse direction. In one embodiment, roll damping valve 338R is restrictive when fluid is flowing from the second line 342 to the first line 340 or reservoir 226, and free flowing in the reverse direction.

Figure 6:
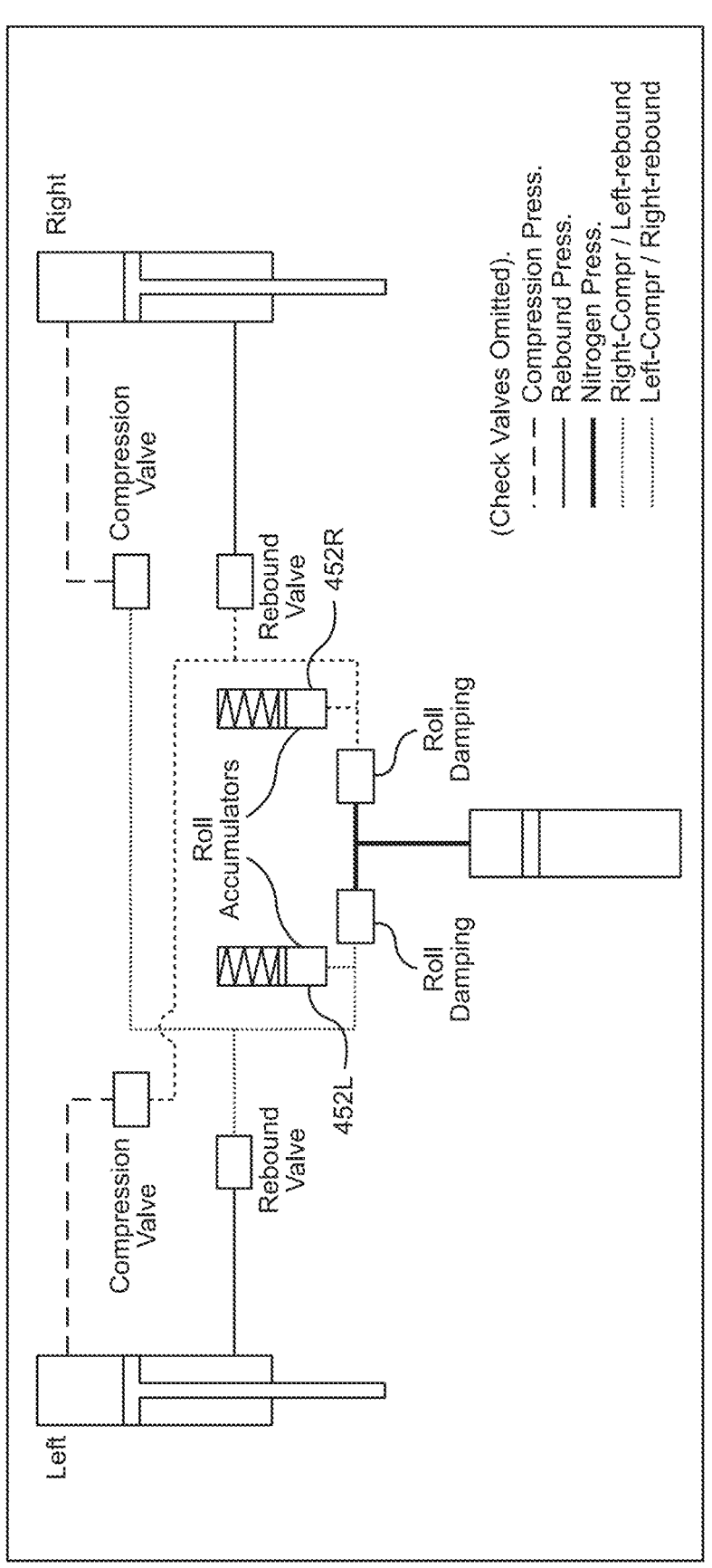
FIG. 6 is a diagram of a hydraulically cross-linked suspension system with roll damping valves and accumulators, in accordance with one embodiment.

FIG. 6 is a diagram of a hydraulically cross-linked suspension system 300 with roll damping valves 338 and accumulators 452L/R, in accordance with one embodiment.

In one embodiment, accumulators 452L/R are used to account for higher frequency control, for example wheel shake. In one embodiment, accumulators 452L/R are tuned to reduce the harshness for a rider by decreasing the frequency response at high frequencies. In one embodiment, there is not much damping during low flow rates since the accumulator response is velocity based. In one embodiment, the compression valves 222L/R and rebound valves 224L/R also assist in reducing wheel shake.

Figure 13:
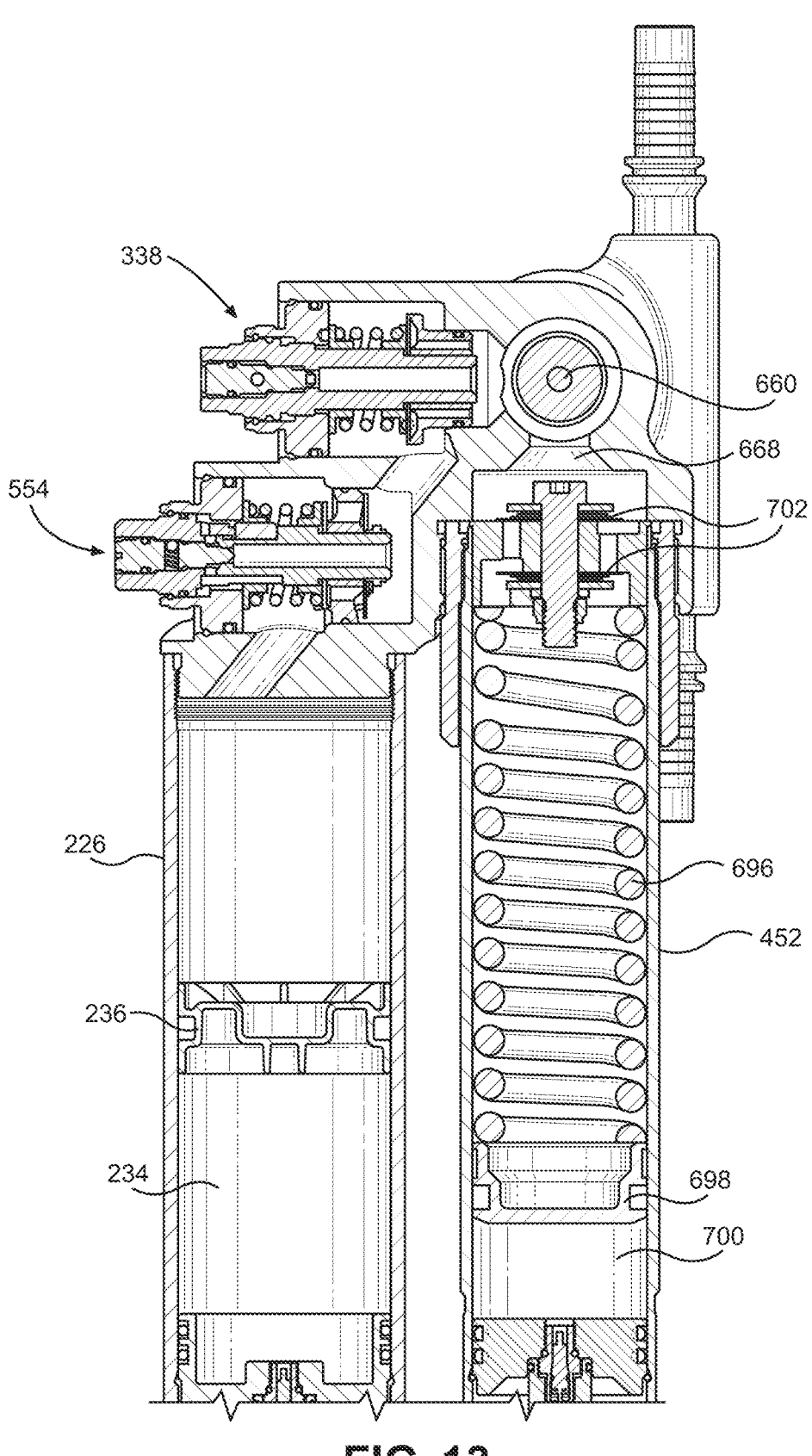
FIG. 13 is a cross section view of accumulator, manifold, and reservoir, in accordance with one embodiment.

Further details on accumulators 452L/R can be found in the discussion for at least FIG. 13.

Figure 7:
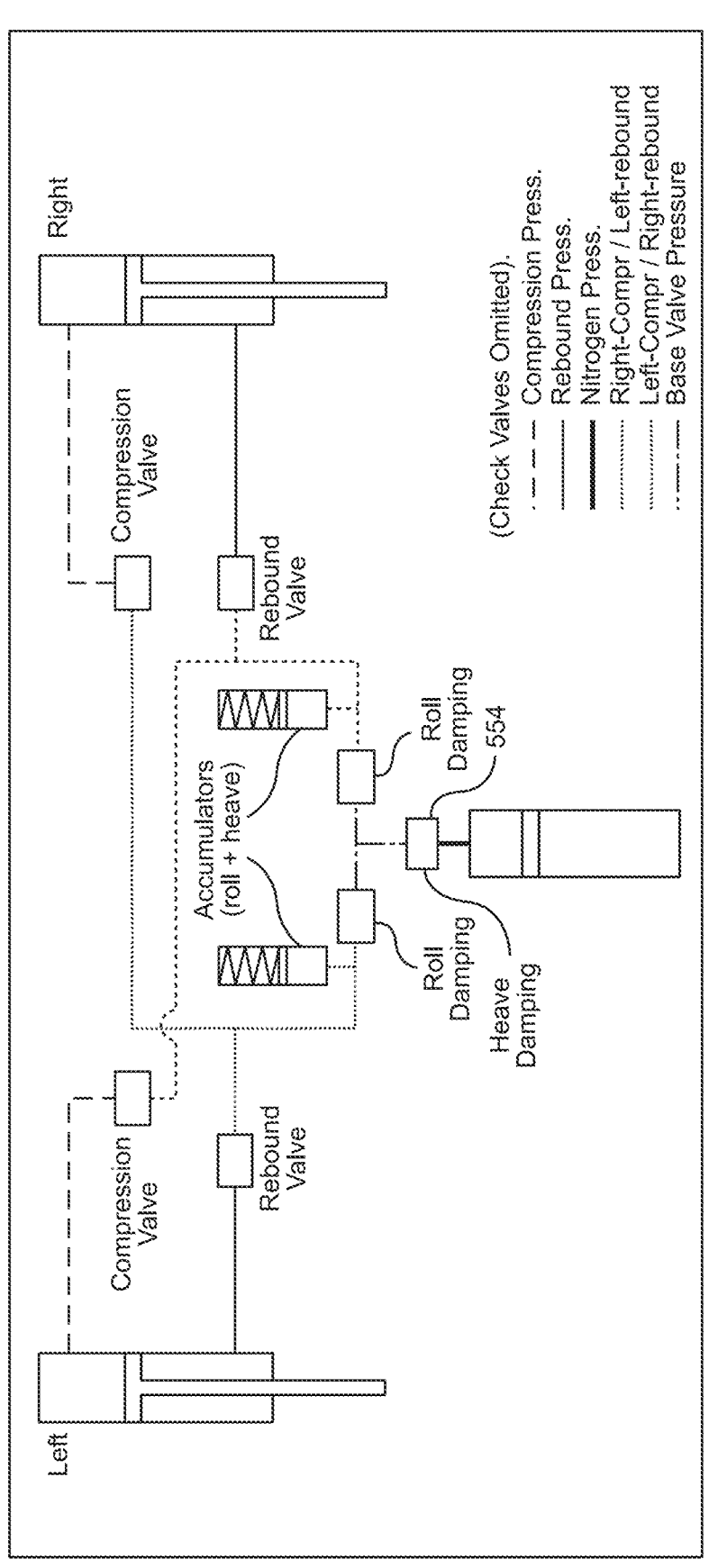
FIG. 7 is a diagram of a hydraulically cross linked suspension system with roll damping valves, accumulators, and heave damping valve, in accordance with one embodiment.

FIG. 7 is a diagram of a hydraulically cross-linked suspension system 300 with roll damping valves 338, accumulators 452L/R, and heave damping valve 554, in accordance with one embodiment. In one embodiment, a tuner or user can change the amount of heave damping offered by heave damping valve 554 independently of other damping directions, such as roll. In one embodiment, the damping settings are tuned to the vehicle, or are a factory default. In one embodiment, a user can control the damping settings via a knob, switch, remote controls, or the like.

In one embodiment, an additional valve placed on the shared line 232 can assist in damping during heave events. In one embodiment, have damping valve 554 restricts fluid flow entering reservoir 226, while allowing free fluid flow in the opposite direction. In one embodiment, have damping valve 554 restricts fluid flow in both directions. In one embodiment, have damping valve 554 allows free fluid flow in both directions.

Similar to the roll damping valves 338L/R, heave damping valve 554 can be a passive valve, semi-active valve, or an active valve. In one embodiment, heave damping valve 554 utilizes a bypass port piston, as previously described.

In one embodiment, there is no fluid flow through the heave damping valve 554 during events where there is no heave (e.g., during roll based events).

Figure 8:
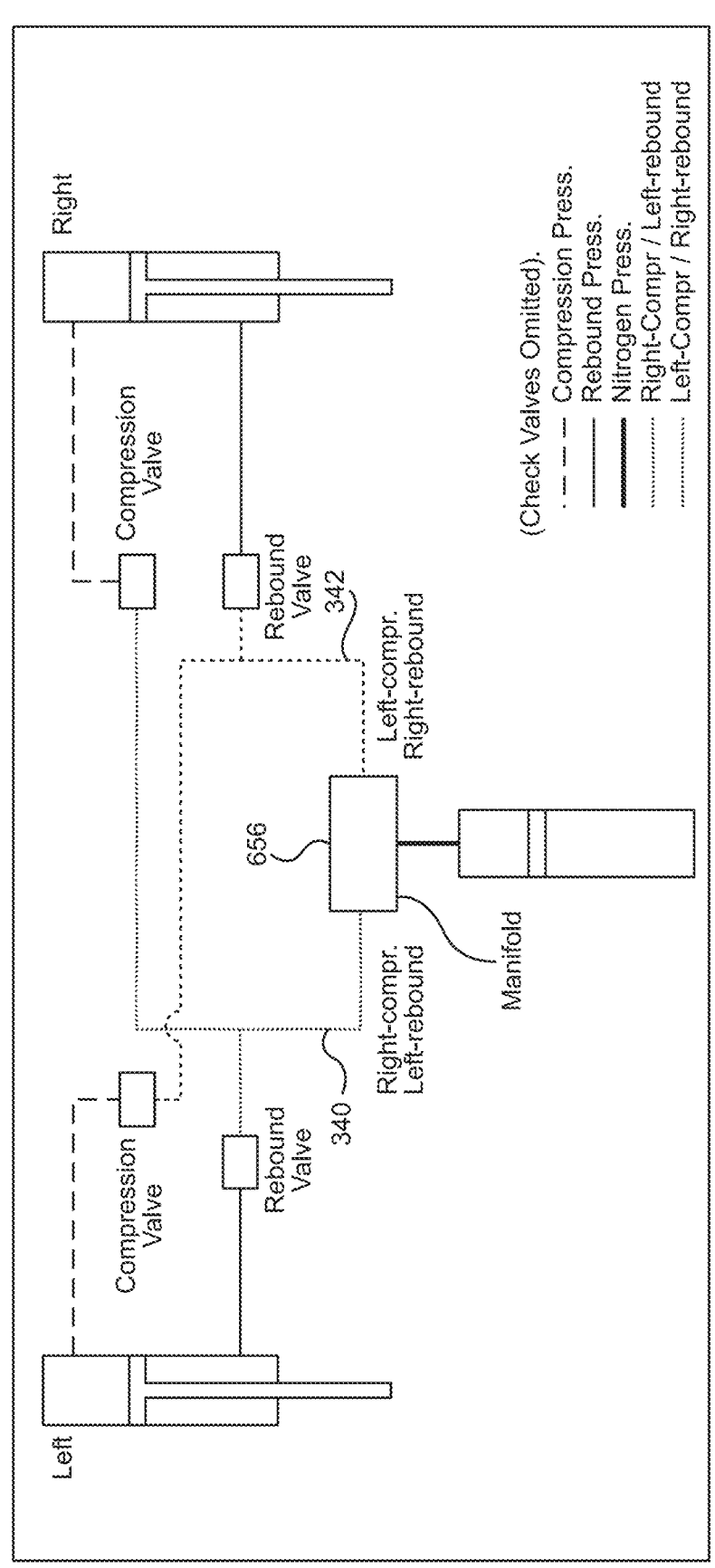
FIG. 8 is a diagram of a hydraulically cross linked suspension system with a manifold, in accordance with one embodiment.

FIG. 8 is a diagram of a hydraulically cross-linked suspension system 300 with a manifold 656, in accordance with one embodiment. In one embodiment, first line 340 fluidly connects manifold 656 with rebound valve 224L and compression valve 222R, while a second line 342 fluidly connects manifold 656 with rebound valve 224R and compression valve 222L.

In one embodiment, compression valves 222L/R and rebound valves 224L/R are omitted.

In one embodiment, not limited to embodiments that include manifold 656, there is a pump connecting first line 340 and second line 342 that allows fluid to bypass the manifold 656, roll damping valves 338L/R, or the heave damping valve 554. This pump would be able to extend the shock assemblies 220L/R and raise the vehicle as needed. In one embodiment, the pump can direct flow in either direction, and raise a specific side of the vehicle as directed by a user.

Manifold

In one embodiment, manifold 656 is structured to be able to control roll and heave damping independently. In one embodiment, a tuner or user can change the amount of heave and roll damping offered by manifold 656 independently of each other. In one embodiment, the damping settings are tuned to the vehicle, or are a factory default. In one embodiment, a user can control the damping settings via a knob, switch, remote controls, or the like.

It should be noted that while manifold 656 is discussed in terms of managing roll and heave of a vehicle, the application of manifold 656 is not limited to such scenarios. In one embodiment, roll damping valve 338 may be referred to as a unidirectional pressure relief valve, unidirectional valve, pressure relief valve, etc.

Manifold 656 can also be used for instances such as electronic compression and rebound control. Additional information regarding electronic compression and rebound control can be found in U.S. Patent Application 2022/0176769 which is incorporated by reference herein, in its entirety. Additional information regarding electronic compression and rebound control can be found in U.S. Pat. No. 10,737,546 which is incorporated by reference herein, in its entirety.

Additionally, heave damping valve 554 may be referred to as second valve, or similar terms based on the application. For the sake of clarity and brevity, the designations roll damping valve 338 and heave damping valve 554 will continue to be used.

Figure 9:
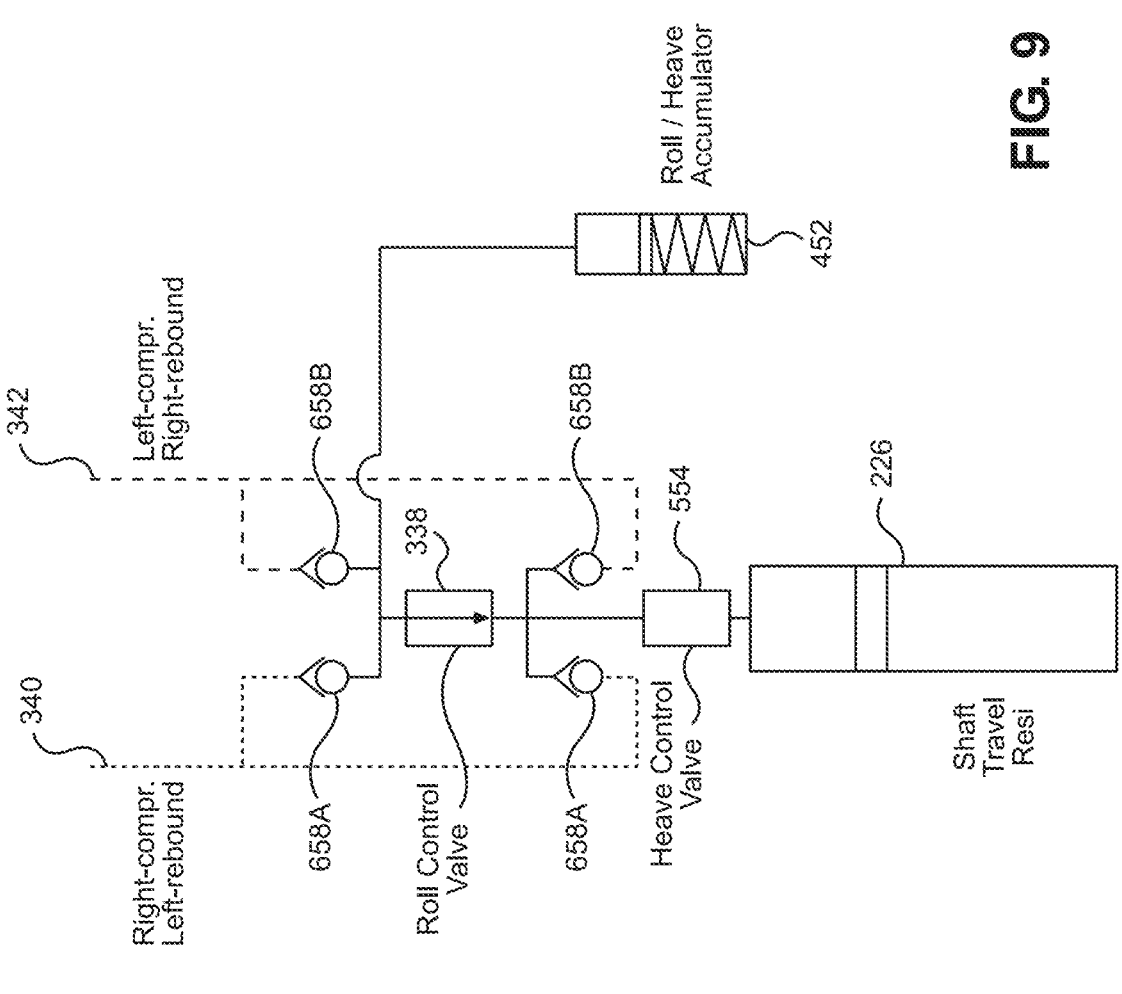
FIG. 9 is a diagram of manifold, accumulator, and reservoir, in accordance with one embodiment.

FIG. 9 is a diagram of manifold 656, accumulator 452, and reservoir 226, in accordance with one embodiment. In one embodiment, manifold 656 incorporates roll damping valve 338, heave damping valve 554, and check valves 658A/B into a single component. In one embodiment, roll damping valve 338 is a unidirectional pressure relief valve.

Figure 10:
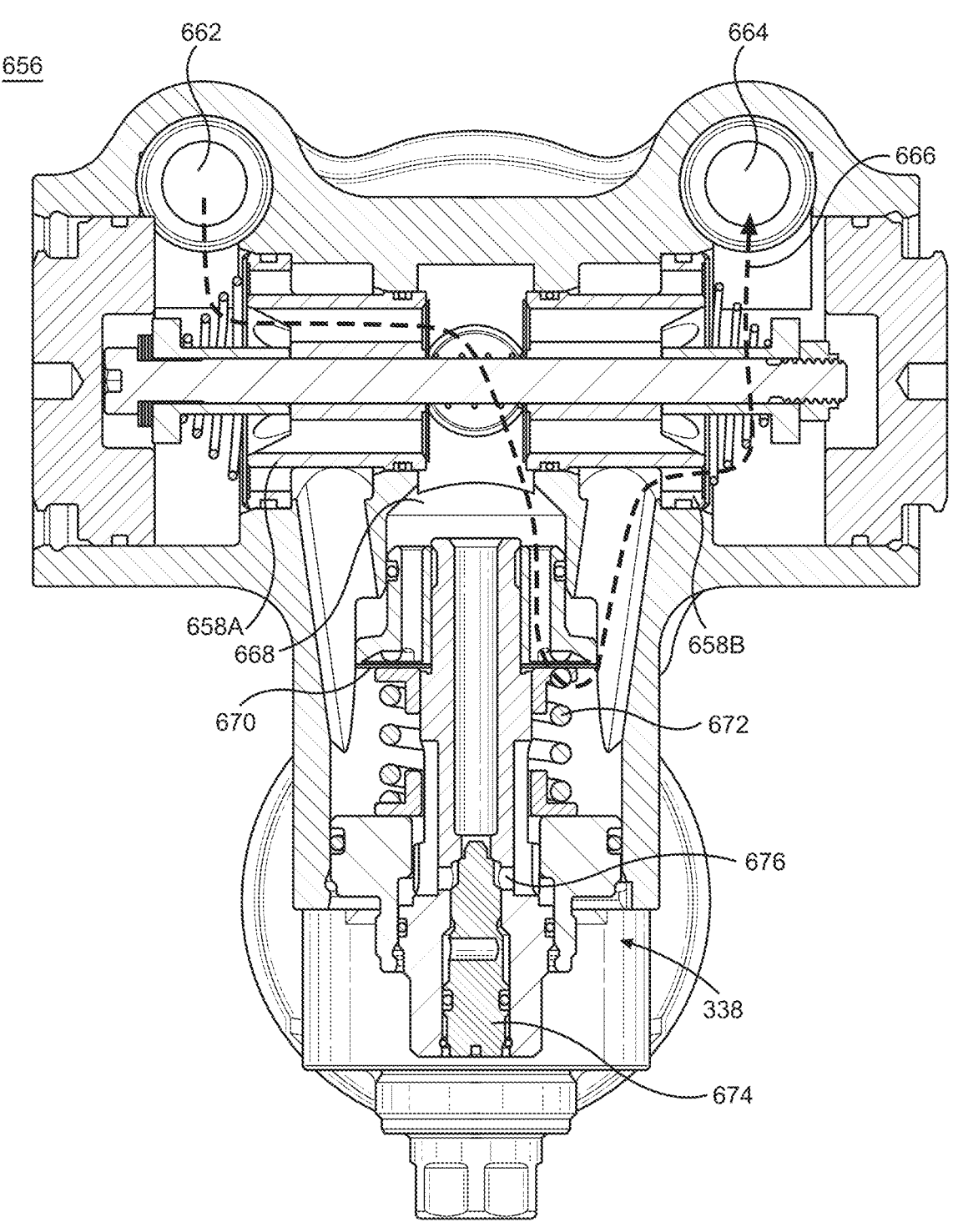
FIG. 10 is a cross section view of manifold from a top down perspective, in accordance with one embodiment.
Figure 12:
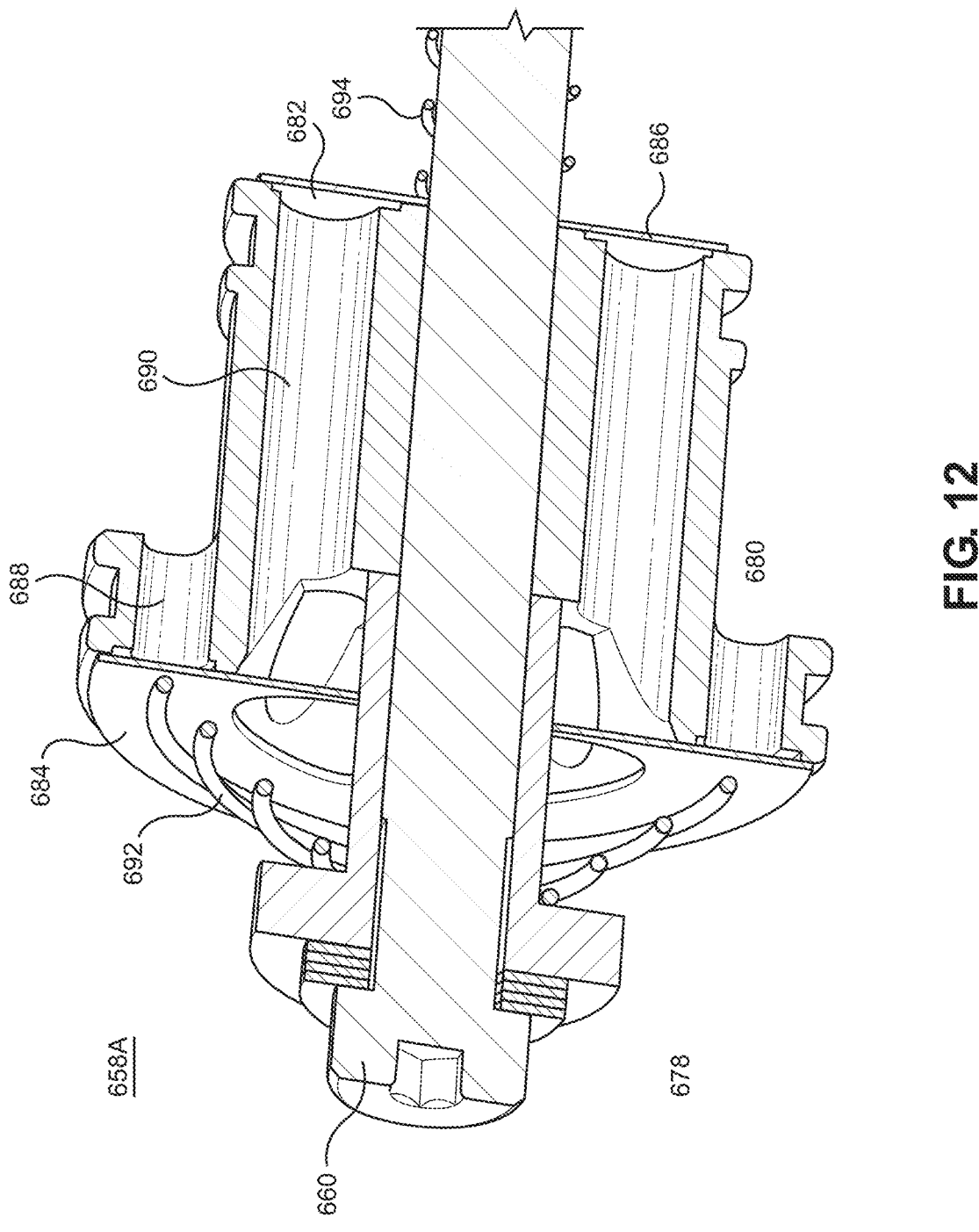
FIG. 12 is a cut away view of check valve, in accordance with one embodiment.

In one embodiment, while four check valves 658 are shown in FIG. 9, it should be understood that the diagram is for the purpose of clarity, and four separate check valves 658 are not required. At least FIG. 10 shows an embodiment with two check valves 658A/B. At least FIG. 12 shows check valves 658A/B in more detail.

In one embodiment, through the use of check valves 658A/B fluid can flow through a single roll damping valve 338 as well as share a single accumulator 452. This design has the benefit of fewer parts. In roll events, the performance is similar even with a single accumulator 452, as the embodiment shown in at least FIG. 7 would only utilize one accumulator 452L/R at a time. In heave events, the shared accumulator shown in at least FIG. 9 is stiffer than either of the accumulators 452L/R shown in at least FIG. 7. Referring to FIG. 9, the increase in stiffness can be beneficial as fluid volume displaced by the shaft is used to fill the accumulator 452 during heave events, whereas piston flow is usually used during roll events. A single accumulator is also beneficial in situations with tight packaging restraints, where there may not be enough room for two separate accumulators.

In one embodiment, manifold 656 has a first check valve to meter fluid flow between a first chamber, a second chamber, and a third chamber, wherein the first check valve meters fluid flow between one or more of the first chamber and the third chamber and the second chamber and the first chamber. Manifold 6565 also has a second check valve to meter fluid flow between the second chamber, the third chamber, and a fourth chamber, wherein the second check valve meters fluid flow between one or more of the fourth chamber and the third chamber and the second chamber and the fourth chamber.

FIG. 10 is a cross section view of manifold 656 from a top down perspective, in accordance with one embodiment. Also included are high pressure line 662, low pressure line 664, flow path 666, chamber 668, shim 670, spring 672, adjuster 674, and ports 676.

In one embodiment, manifold 656 includes at least two check valves 658A/B and a roll damping valve 338. In FIG.

10, fluid is flowing from the high pressure line 662 to the low pressure line 664. It should be noted that in at least FIG. 11, the positions of the high pressure line 662 and the low pressure line 664 are reversed. As shown in at least FIG. 9, fluid can enter and exit manifold 656 from at least two sources, so the direction of fluid flow is dependent on the pressure differential between the two lines. In one embodiment, the high pressure line 662 and the low pressure line 664 may also be referred to as first line 340 and second line 342 depending on the scenario.

As shown by flow path 666, fluid enters manifold 656 through high pressure line 662 and passes through check valve 658A. Once past check valve 658A, fluid can flow through chamber 668 and into accumulator 452, as well as through the piston on roll damping valve 338 and into reservoir 226. The flow path to reservoir 226 can be seen in at least FIG. 13.

While roll damping valve 338 is shown to be a passive valve, in another embodiment it is an electronic valve. In one embodiment, roll damping valve 338 is based on a stiff load bearing spring 672 that has a preload against shim 670. In one embodiment, roll damping valve 338 has a preload that must be overcome before fluid will flow through shim 670. In one embodiment, adjuster 674 can be moved, either manually or electronically, to change the amount of fluid flow through ports 676 and change the preload on spring 672. In one embodiment, the preload can be tuned to the needs of the vehicle and its cornering conditions. In which case, if a bump is hit while cornering then any additional pressure would be able to blow off and not upset the vehicle during the action.

One benefit of this structure is that there will not be a loss in the damping on the side of the vehicle that encounters the event (e.g., hitting a bump while cornering), so the damping characteristics can be maintained even while sway is occurring. The manifold structure is able to accomplish this with fewer components compared to other solutions.

After passing through roll damping valve 338, fluid can then flow through check valve 658B and out the low pressure line 664.

Figure 11:
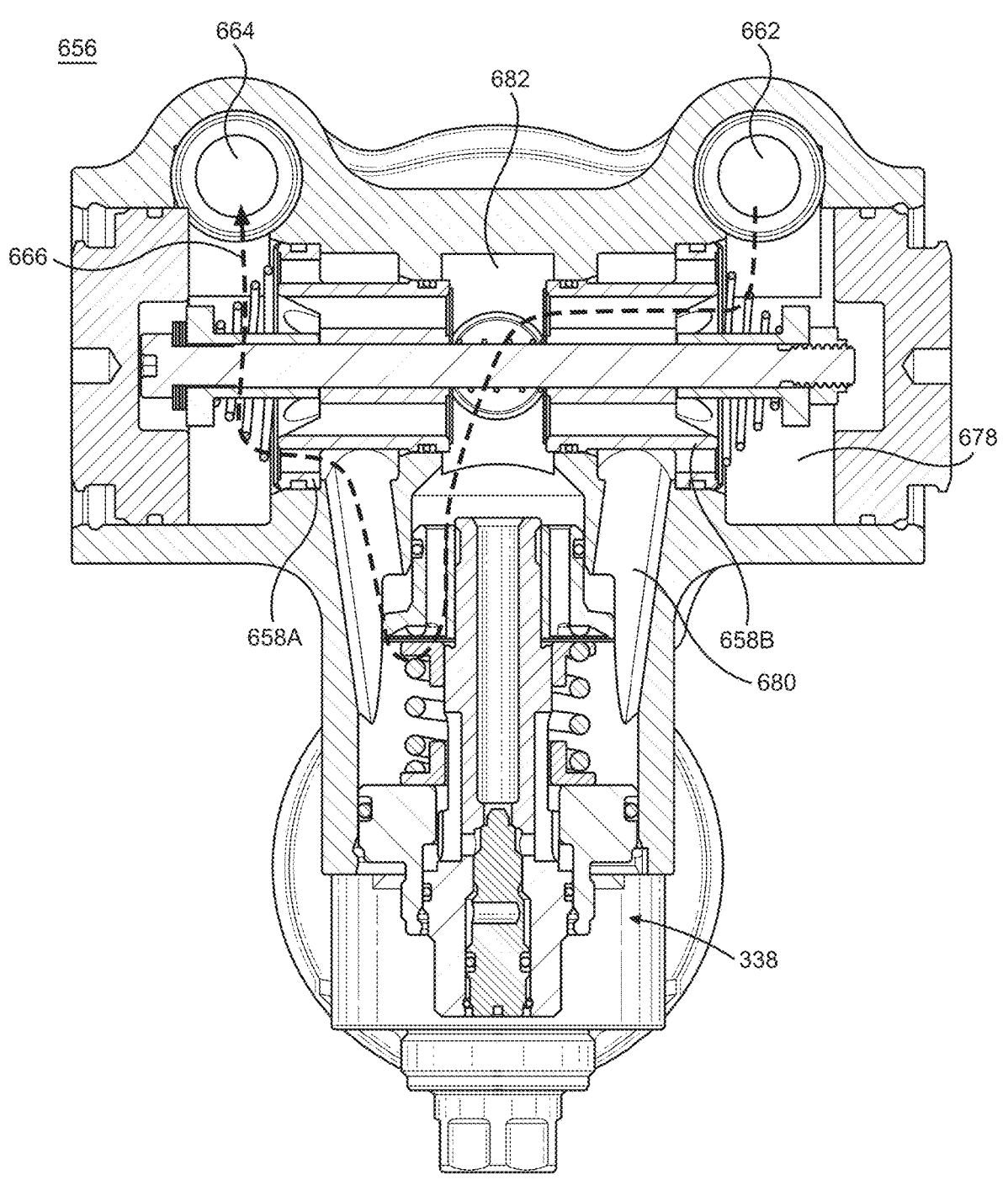
FIG. 11 is a cross section view of manifold from a top-down perspective, in accordance with one embodiment.

FIG. 11 is a cross section view of manifold 656 from a top down perspective, in accordance with one embodiment.

As shown in FIG. 11, flow path 666 is a mirrored flow path as the one shown in at least FIG. 10 when the position of the high pressure line 662 and low pressure line 664 is reversed. In this case, fluid enters manifold 656 through high pressure line 662 and passes through check valve 658B. Once past check valve 658B, fluid can flow through chamber 668 and into accumulator 452, as well as through the piston on roll damping valve 338 and into reservoir 226. After passing through roll damping valve 338, fluid can then flow through check valve 658A and out the low pressure line 664.

FIG. 12 is a cut away view of check valve 658A, in accordance with one embodiment. In one embodiment, check valves 658A/B are of similar structure and mirrored with a central shaft 660 coupling the two. There is a first chamber 678, a second chamber 680, a third chamber 382, and a fourth chamber 683. In one embodiment, first chamber 678 and fourth chamber 683 are mirror images of one another. In one embodiment, fluid flow from second chamber 680 to fourth chamber 683 is allowed through outer port 688, while the reverse is blocked by first shim 684. Fluid flow from fourth chamber 683 to third chamber 682 is allowed through inner port 690, while the reverse is blocked by second shim 686. There is no fluid flow between second chamber 680 and third chamber 682 as there are no ports to connect the two chambers directly.

It should be understood that check valve 658B works similarly to check valve 658A but mirrored, and where fourth chamber 683 is used for check valve 658A first chamber 678 applies to check valve 658B.

In one embodiment, first spring 692 is used to bias first shim 684 towards a closed position. First spring 692 sets a preload against first shim 684 that must be overcome before fluid can flow through the outer port 688. In one embodiment, first shim 684 has at least one hole to allow fluid to flow freely into inner port 690.

In one embodiment, second spring 694 is used to bias second shim 686 towards a closed position. Second spring 694 sets a preload against second shim 686 that must be overcome before fluid can flow through the inner port 690. In one embodiment, second spring 694 is used for both check valve 658A and check valve 658B (as seen in at least FIG. 11). In one embodiment, a different second spring 694 is used for check valve 658A and check valve 658B. In embodiments where a different second spring 694 is used for check valve 658A and check valve 658B, the two second springs 694 can have different spring constants. In one embodiment, first spring 692 has the same spring constant between check valve 658A and check valve 658B. In one embodiment, first spring 692 has a different spring constant between check valve 658A and check valve 658B.

Figure 18:
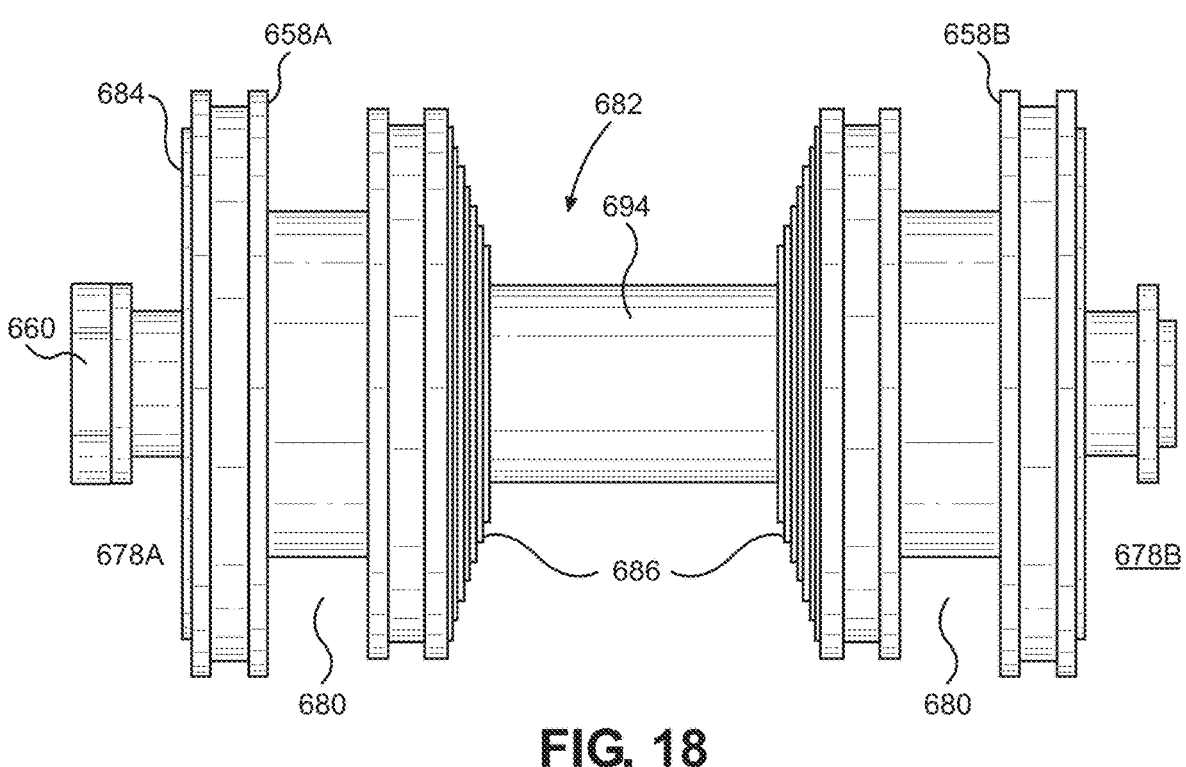
FIG. 18 is a side view of check valves where the second shim is a shim stack.
Figure 19:
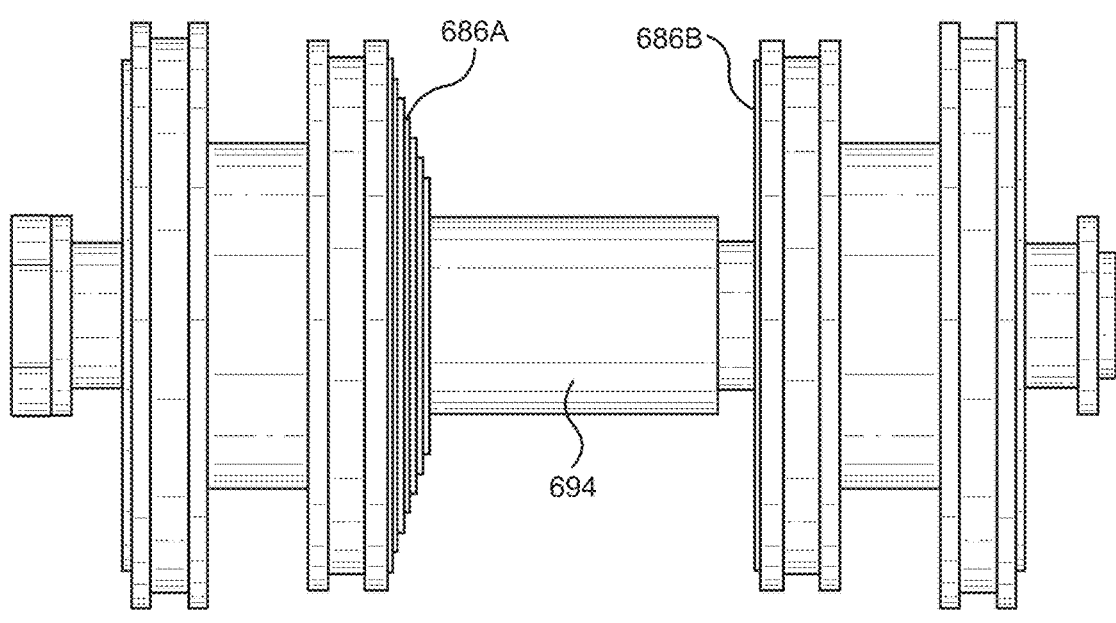
FIG. 19 is a side view of check valves where second shim is a shim stack and second shim is a single shim.

In one embodiment, first shim 684 and second shim 686 are both a single shim. In one embodiment, first shim 684 and second shim 686 are both shim stacks. FIG. 18 is a side view of check valves 658A/B where the second shim 686 is a shim stack. In one embodiment, first shim 684 and second shim 686 are a combination of a shingle shim and a shim stack. FIG. 19 is a side view of check valves 658A/B where second shim 686A is a shim stack and second shim 686B is a single shim. In one embodiment, spring 694 is only acing upon one instance of second shim 686.

Figure 20:
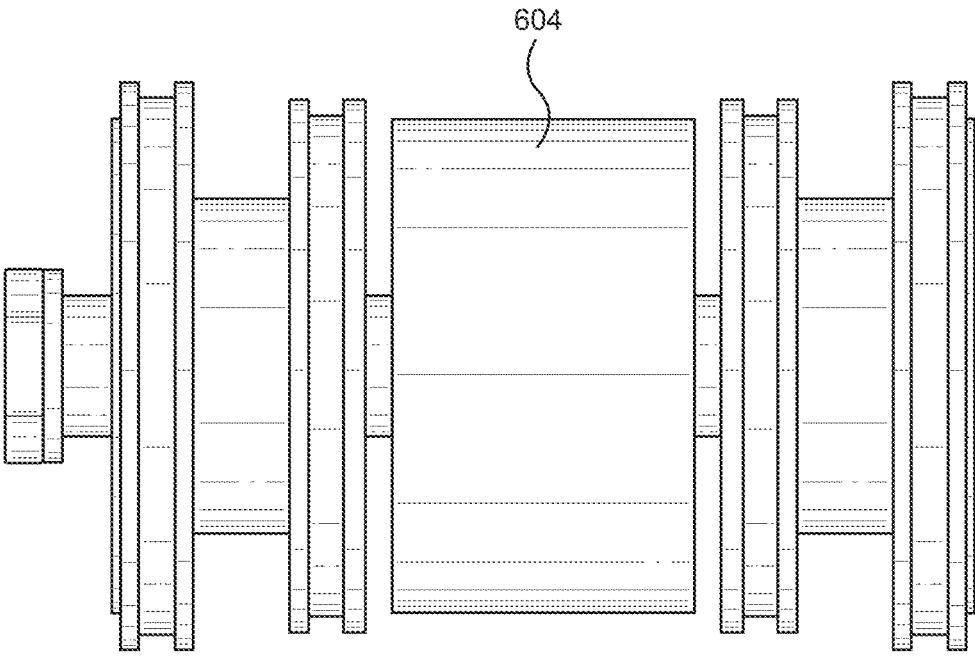
FIG. 20 is a side view of check valves with a frequency check valve.

FIG. 20 is a side view of check valves 658A/B with a frequency check valve 604. In one embodiment, check valve 658A and check valve 658B utilize a frequency check valve 604. In one embodiment, the frequency check valve 604 allows flow to momentarily bypass the electronic valve to add frequency dependency.

In one embodiment, manifold 656 can be used with cross-linked system 200, 300, as shown in at least FIG. 8.

Figure 16:
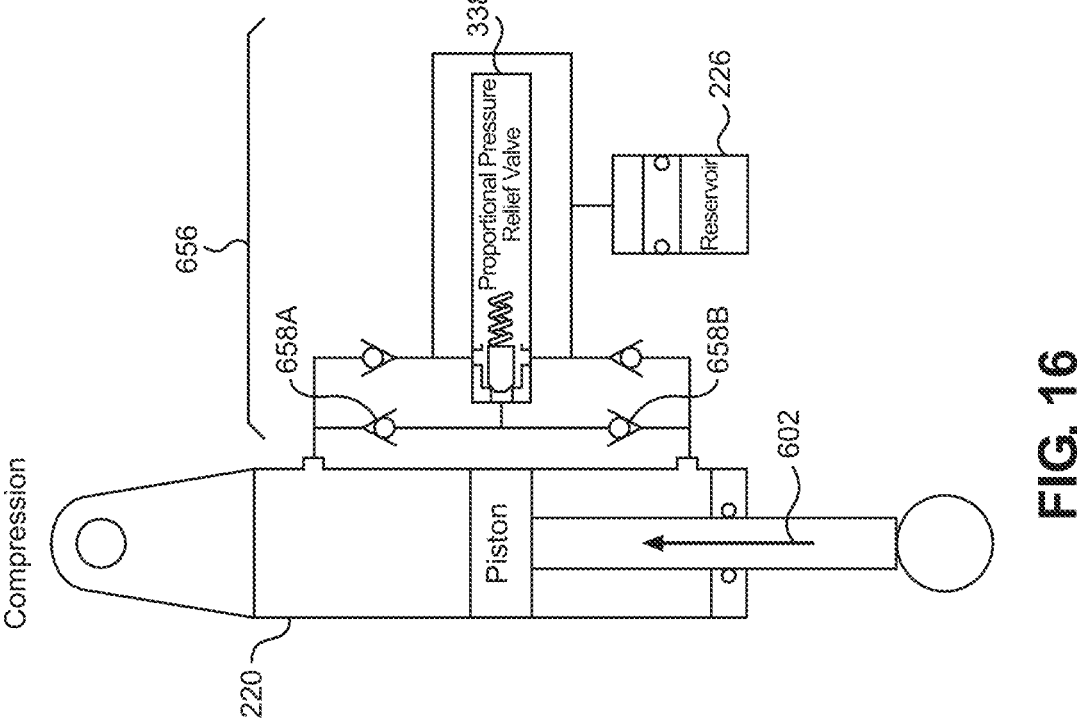
FIG. 16 is a diagram of manifold regulating fluid flow of a shock assembly during a compression stroke.

In one embodiment, manifold 656 is used to compression and rebound in a shock assembly 220. FIG. 16 is a diagram of manifold 656 regulating fluid flow of a shock assembly 220 during a compression stroke. Movement arrow 602 shows the direction of movement. In one embodiment, during a compression stroke fluid will flow out of the compression chamber of shock assembly 220 and through check valve 658A. fluid will then flow through the unidirectional valve 338, through check valve 658B, and into the rebound chamber of shock assembly 220. After passing through unidirectional valve 338, fluid can also flow into reservoir 226.

Figure 17:
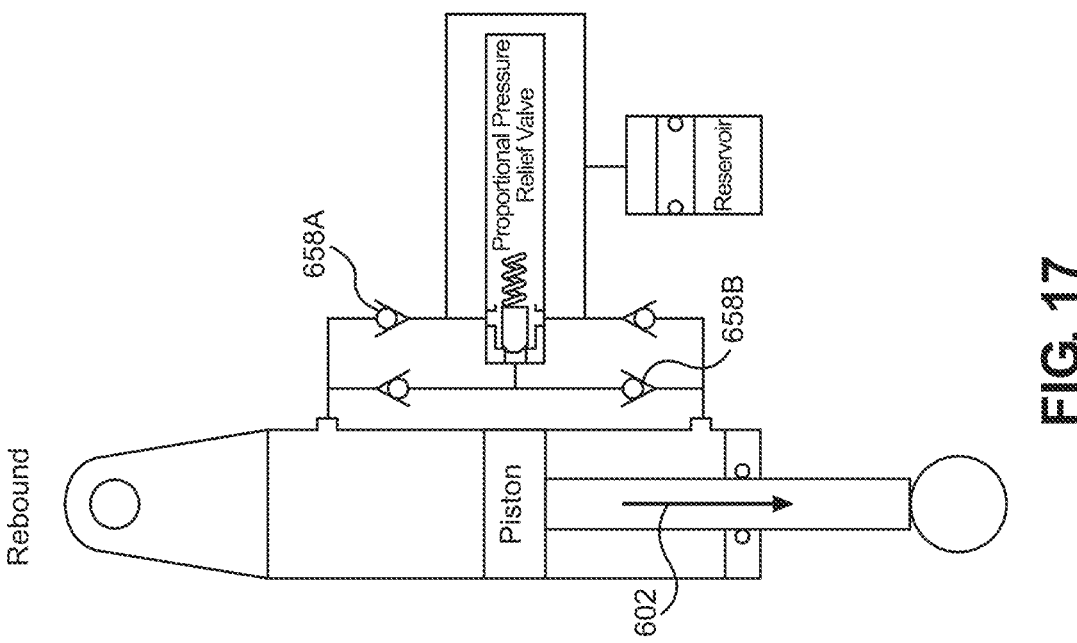
FIG. 17 is a diagram of manifold regulating fluid flow of a shock assembly during a rebound stroke.

FIG. 17 is a diagram of manifold 656 regulating fluid flow of a shock assembly 220 during a rebound stroke. Movement arrow 602 shows the direction of movement. In one embodiment, during a rebound stroke fluid will flow out of the rebound chamber of shock assembly 220 and through check valve 658B. Fluid will then flow through the unidirectional valve 338, through check valve 658A, and into the compression chamber of shock assembly 220. After passing through unidirectional valve 338, fluid can also flow into reservoir 226.

In one embodiment, where an accumulator is not utilized, there is no chamber 668 in manifold 656. In one embodiment, high pressure line 662 connects to a rebound chamber of a shock assembly, while low pressure line 664 connects to a compression chamber of the same shock assembly. In one embodiment, high pressure line 662 connects to a compression chamber of a shock assembly, while low pressure line 664 connects to a rebound chamber of the same shock assembly.

Accumulator

FIG. 13 is a cross section view of accumulator 452, manifold 656, and reservoir 226, in accordance with one embodiment.

In one embodiment, heave damping valve 554 is optional and may be removed and replaced with a plug to prevent fluid leakage or pressure loss. In one embodiment, there is no space for heave damping valve 554 as it is not utilized. In one embodiment, heave damping valve 554 is replaced with a different valve.

In one embodiment, accumulator 452 has a spring chamber 695, negative spring 696, second IFP 698, accumulator gas chamber 700 (or gas chamber 700), and optionally, shim stacks 702.

In one embodiment, fluid flows into spring chamber 695 which houses negative spring 696, with the fluid pressure acting against the negative spring 696 to push the second IFP 698 and expand the chamber, in turn compressing the accumulator gas chamber 700. In one embodiment, gas pressure in accumulator gas chamber 700 will be higher than gas pressure in gas chamber 234. In one embodiment, negative spring 696 is sized so that the force on the second IFP 698 from the gas in accumulator gas chamber 700 is balanced by the combined force of the negative spring 696 and the pressure from gas chamber 234. The balanced forced prevents the need for a large initial pressure to overcome the gas pressure in accumulator gas chamber 700 of the accumulator which is desired in some applications to improve performance.

Conventionally, high pressure accumulators cannot reach lower pressures. In one embodiment, adding a negative spring 696 to an accumulator will linearize the buildup of pressure, allowing for lower pressures. One benefit of a negative spring accumulator is that it can be compact but does not have a limited pressure range. In one embodiment, negative spring 696 has a light spring constant. In one embodiment, at least one adjustment plate 710 can be added to alter the stiffness of accumulator 452.

In one embodiment, piston 701 and shim stacks 702 act to meter fluid flow in and out of spring chamber 695. When entering and exiting accumulator 452, fluid will have to be of a pressure sufficient to open and pass shim stacks 702. In one embodiment, shim stacks 702 are identical. In one embodiment, shim stacks 702 are different, and have different opening pressures. In one embodiment, shims stacks 702 are made of at least one shim. In one embodiment, there is at least one shim stack 702 to meter fluid flow in and out of spring chamber 695.

Figure 14:
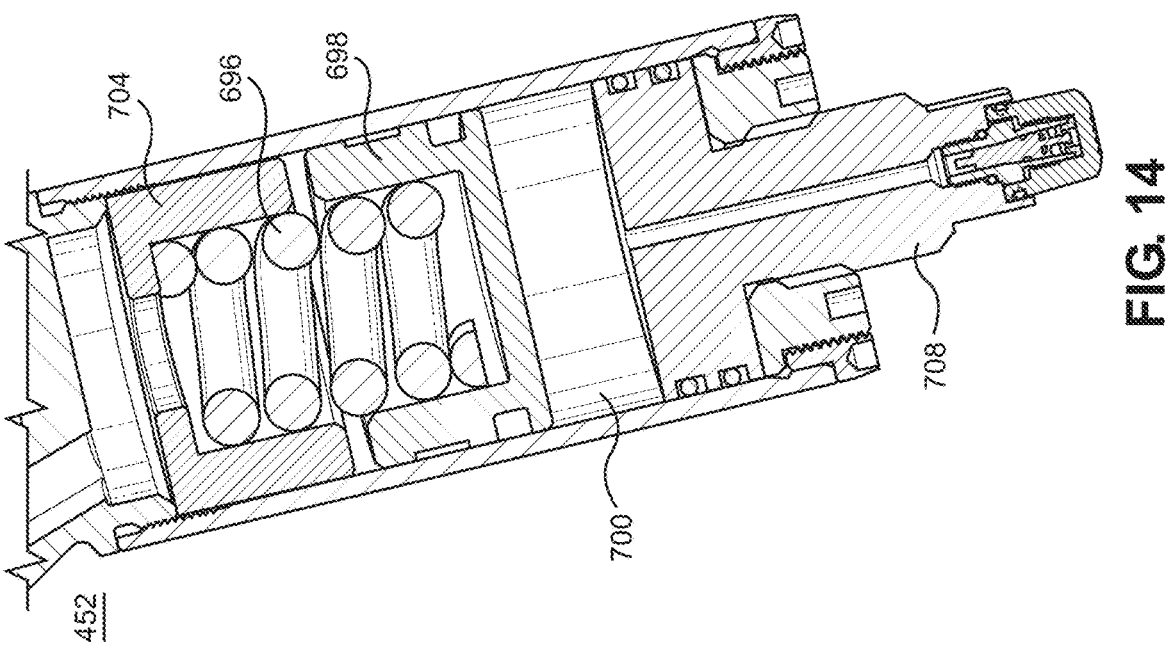
FIG. 14 is a cross section view of an accumulator with a fill.

FIG. 14 is a cross section view of an accumulator 452 with a fill 708. In one embodiment, fill 708 is used to adjust the pressure in accumulator gas chamber 700. In one embodiment, fill 708 is manually operated. In one embodiment, fill 708 is electronically controlled. In one embodiment, fill 708 uses a passive valve, a semi active valve, or an active valve to adjust the pressure in accumulator gas chamber 700.

In one embodiment, retainer 704 is used to maintain the placement of negative spring 696. In one embodiment, retainer 704 is used in the absence of piston 701. In one embodiment, retainer 704 is used in conjunction with piston 701.

Figure 15:
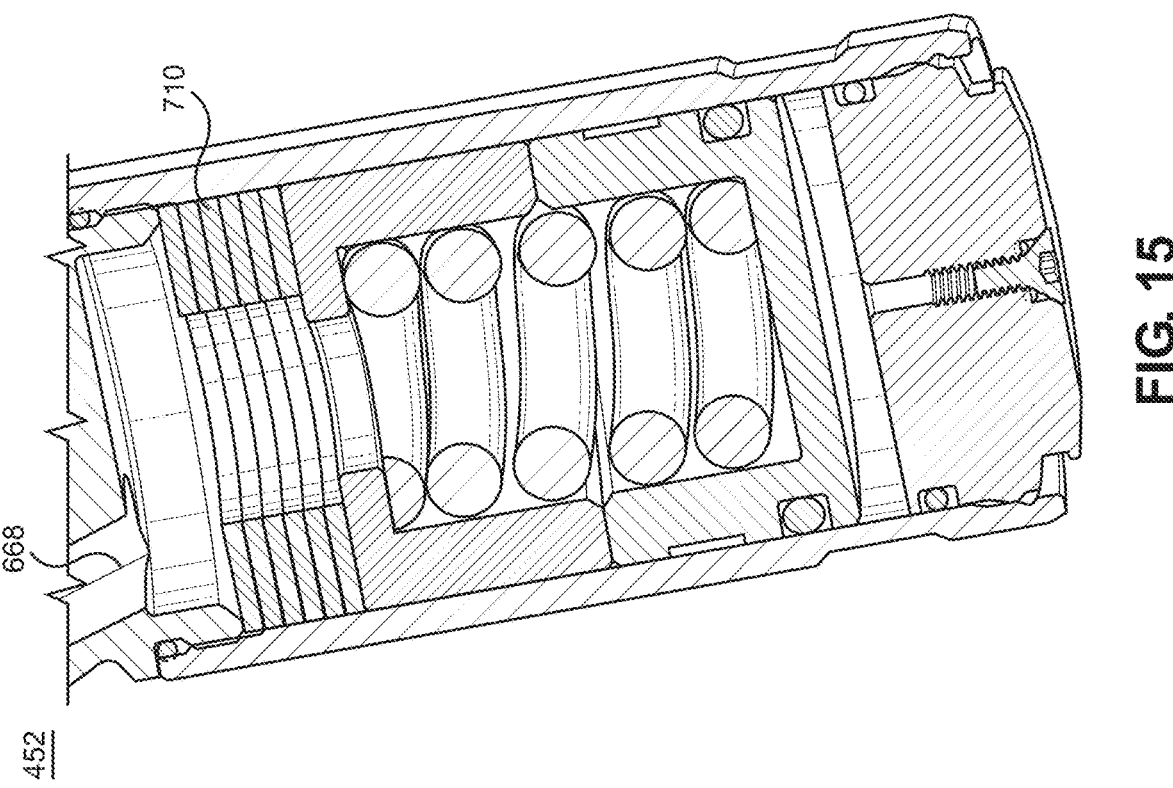
FIG. 15 is a cross section view of an accumulator with adjustment plates.

FIG. 15 is a cross section view of an accumulator 452 with adjustment plates 710. In one embodiment, adjustment plates 710 are used to adjust the pressure acting against accumulator gas chamber 700. In one embodiment, adjustment plates are placed between retainer 704 and the entrance to chamber 668. In one embodiment, adjustment plates 710 are used without retainer 704.

In one embodiment, accumulator 452 can be used with cross-linked system 200, 300, as shown by at least FIG. 7. In one embodiment, accumulator 452 can be used with cross-linked system 200, 300 and manifold 656 as shown by at least FIG. 9. In one embodiment, accumulator 452 can be used with manifold 656, as shown by at least FIG. 13.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments can be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What we claim is:

1. An accumulator comprising:
   a cylinder;
   an internal floating piston, to divide the cylinder into a spring chamber and a gas chamber, the spring chamber to allow fluid to flow, wherein any movement of said internal floating piston to move further into said gas chamber is based upon a fluid pressure on a side of said internal floating piston which does not face said gas chamber; and
   a negative spring disposed in the spring chamber, said negative spring having a spring force such that a force on said internal floating piston from said gas chamber and a force from said negative spring are balanced.

2. The accumulator of claim 1 further comprising:
a piston with at least one shim stack to meter fluid flow in and out of the spring chamber.

3. The accumulator of claim 1 further comprising:
at least one adjustment plate to alter the stiffness of the accumulator.

4. The accumulator of claim 1 further comprising:
a retainer fit to maintain the placement of the negative spring.

5. The accumulator of claim 1 wherein, the gas pressure in the gas chamber is higher than the gas pressure in a reservoir gas chamber.

6. The accumulator of claim 5 wherein, the negative spring is sized so that the force on the internal floating piston from the gas in the gas chamber is balanced by the combined force of the negative spring and the pressure from the reservoir gas chamber.

7. An accumulator comprising:
a cylinder;
an internal floating piston, to divide the cylinder into a spring chamber and a gas chamber, the spring chamber to allow fluid to flow, wherein any movement of said internal floating piston to move further into said gas chamber is based upon a fluid pressure on a side of said internal floating piston which does not face said gas chamber;
a negative spring disposed in the spring chamber, said negative spring having a spring force such that a force on said internal floating piston from said gas chamber and a force from said negative spring are balanced; and
a piston with at least one shim stack to meter fluid flow in and out of the spring chamber.

8. The accumulator of claim 7 further comprising:
at least one adjustment plate to alter the stiffness of the accumulator.

9. The accumulator of claim 7 further comprising:
a retainer fit to maintain the placement of the negative spring.

10. The accumulator of claim 7 wherein, the gas pressure in the gas chamber is higher than the gas pressure in a reservoir gas chamber.

11. The accumulator of claim 10 wherein, the negative spring is sized so that the force on the internal floating piston from the gas in the gas chamber is balanced by the combined force of the negative spring and the pressure from the reservoir gas chamber.

12. A cross-linked system comprising:
a first shock assembly;
a second shock assembly;
a first line fluidly coupled with a first rebound chamber of the first shock assembly and a second compression chamber of the second shock assembly, to allow fluid to flow between the first rebound chamber and the second compression chamber;
a second line fluidly coupled with a first compression chamber of the first shock assembly and a second rebound chamber of the second shock assembly, to allow fluid to flow between the first compression chamber and the second rebound chamber;
a reservoir, wherein the reservoir fluidly coupled to the first line and the second line; and
an accumulator fluidly coupled to said first line and said second line, said accumulator comprising:
a cylinder;
an internal floating piston, to divide the cylinder into a spring chamber and a gas chamber, the spring chamber to allow fluid to flow, wherein any movement of said internal floating piston to move further into said gas chamber is based upon a fluid pressure on a side of said internal floating piston which does not face said gas chamber; and
a negative spring disposed in the spring chamber, said negative spring having a spring force such that a force on said internal floating piston from said gas chamber and a force from said negative spring are balanced.

13. The accumulator of claim 12 further comprising:
a piston with at least one shim stack to meter fluid flow in and out of the spring chamber.

14. The accumulator of claim 12 further comprising:
at least one adjustment plate to alter the stiffness of the accumulator.

15. The accumulator of claim 12 further comprising:
a retainer fit to maintain the placement of the negative spring.

16. The accumulator of claim 12 wherein, the gas pressure in the gas chamber is higher than the gas pressure in a reservoir gas chamber.

17. The accumulator of claim 16 wherein, the negative spring is sized so that the force on the internal floating piston from the gas in the gas chamber is balanced by the combined force of the negative spring and the pressure from the reservoir gas chamber.

* * * * *